United States Patent
Gipson

(10) Patent No.: US 11,467,276 B2
(45) Date of Patent: Oct. 11, 2022

(54) LIVE POINT CLOUD COMPRESSION WITH EGOMOTION PROPAGATION

(71) Applicants: VOLKSWAGEN AKTIENGESELLSCHAFT, Wolfsburg (DE); AUDI AG, Ingolstadt (DE); DR. ING H.C. F. PORSCHE AKTIENGESELLSCHAFT, Stuttgart (DE)

(72) Inventor: Jerramy Lee Gipson, Willits, CA (US)

(73) Assignees: VOLKSWAGEN AKTIENGESELLSCHAFT, Wolfsburg (DE); AUDI AG, Ingolstadt (DE); DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 226 days.

(21) Appl. No.: 17/002,150

(22) Filed: Aug. 25, 2020

(65) Prior Publication Data
US 2022/0066017 A1    Mar. 3, 2022

(51) Int. Cl.
*G01S 13/66* (2006.01)
*G01S 13/931* (2020.01)
*G01S 15/89* (2006.01)

(52) U.S. Cl.
CPC ............ *G01S 13/66* (2013.01); *G01S 13/931* (2013.01); *G01S 15/8925* (2013.01); *G01S 15/8927* (2013.01)

(58) Field of Classification Search
CPC .... G01S 13/66; G01S 13/931; G01S 15/8925; G01S 15/8927; G01S 17/89; G01S 17/931; G01S 7/4808; G06T 9/001
See application file for complete search history.

(56) References Cited

U.S. PATENT DOCUMENTS 8,525,835 B1  9/2013  Wu et al.
10,424,083 B2  9/2019  Sinharoy et al.
(Continued)

OTHER PUBLICATIONS

Feng et al., "Real-Time Spatio-Temporal LiDAR Point Could Compression", arxiv.org, Cornell University Library, 201 Olin Library Cornell University Ithica, NY 14853, Aug. 16, 2020 (Aug. 16, 2020), XP081742423, Paragraph III-D, "Temporal Encloding".

(Continued)

*Primary Examiner* — Timothy A Brainard
(74) *Attorney, Agent, or Firm* — Wong & Rees LLP; Zhichong Gu

(57) ABSTRACT

Approaches, techniques, and mechanisms are disclosed for range data compression. According to one embodiment, a current range data frame for a current time point is generated. Each current range data cell in the current range data frame includes current ranges representing points in a point cloud in a 3D space for the current time point. Accumulated prior ranges in an accumulated prior range buffer are propagated from a prior time point to the current time point. Current ranges in the current range data frame are compared with the propagated accumulated prior ranges to determine range differences between the current ranges and the propagated accumulated prior ranges. A proper subset of current ranges in the set of current ranges is identified based on the range difference. The proper subset of current ranges is included in a range data signal excluding other current ranges not in the proper subset.

20 Claims, 8 Drawing Sheets

(56) References Cited

U.S. PATENT DOCUMENTS

| | | | |
|---|---|---|---|
| 2017/0272651 A1* | 9/2017 | Mathy | G01S 17/894 |
| 2019/0197764 A1* | 6/2019 | Zheng | G01S 7/52085 |
| 2020/0193606 A1* | 6/2020 | Douillard | G06V 10/82 |
| 2021/0018628 A1* | 1/2021 | Sato | G01S 7/484 |
| 2022/0051420 A1* | 2/2022 | Forsgren | G06T 7/70 |

OTHER PUBLICATIONS

Sun et al., "A Novel Coding Architecture For LiDAR Point Cloud Sequence", IEEE Robotics and Automated Letters, IEEE, vol. 5, No. 4, Jul. 17, 2020 (Jul. 17, 2020), pp. 5637-5644, XP011801491, DOI: 10.1109/LRA.2020.3010207, [Retrieved on Jul. 24, 2020] Paragraph III, "Overview of Point Clouds Coding Scheme"; Figure 1.

Itu et al., "Real-Time Streaming Point Cloud Compression for 3D LiDAR Sensor Using U-Net", IEEE Access, vol. 7, Aug. 28, 2019 (Aug. 28, 2019), pp. 113616-113625, XP011742434, DOI: 10.119/ACCESS.2019.2935253 [Retrieved on Aug. 22, 2019].

Wang et al., "Fast Depth Video Compression For Mobile RGB-D Sensors", IEEE Transactions on Circuits and Systms for Video Technology, IEEE, USA, vol. 26, No. 4, Apr. 1, 2016 (Apr. 1, 2016), pp. 673-686, XP011604986, ISSN: 1051-8215, Doi: 10.1109/TCSV. 2015.2416571 [Retrieved on Apr. 1, 2016], Last Paragraph of p. 674.

World Intellectual Property Organization, Application No. PCT/EP21/73010, International Search Report dated Nov. 26, 2021.

\* cited by examiner

440 generate a current range data frame for a current time point 442 propagate accumulated prior ranges in an accumulated prior range buffer 444 compare current ranges and propagated accumulated prior ranges 446 identify a proper subset of current ranges 448 include the proper subset of current ranges in a range data signal 450

*FIG. 4C*

460 decode a proper subset of current ranges from a range data signal 462 propagate accumulated prior ranges in an accumulated prior range buffer 464 combine the proper subset of current ranges and the propagated accumulated prior ranges into a reconstructed current range data frame 466 map a 3D space with a point cloud represented by the reconstructed current range data frame 468

*FIG. 4D*

LIVE POINT CLOUD COMPRESSION WITH EGOMOTION PROPAGATION

TECHNICAL FIELD

Embodiments relate generally to data compression, and, more specifically, to live point cloud compression with egomotion propagation.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Three-dimensional (3D) point cloud data may be collected with sensors such as light detection and ranging (LiDAR) sensors to map a 3D space in a physical environment around the sensors. These sensors may be mounted on a vehicle. The 3D point cloud data may be collected over a series of consecutive time points and accumulated into a very large data set over time. In mapping applications such as those supporting manual or autonomous driving, large amounts of live point cloud data need to be timely acquired, collected, compressed, transmitted, received, decompressed and processed with strict real time requirements with limited computational and communication resources.

Under some approaches, point cloud data can be processed using regular video compression techniques used in non-mapping applications. These video compression techniques typically implement lossy compression that allows image quality degradation to an extent tolerable or imperceptible to a human viewer in a video display application. However, these video compression techniques are prone to generating large errors in spatial range information represented in point cloud data that maps a 3D space. In particular, these large errors may not be tolerable, for example in time-critical mapping applications that support manual or autonomous driving of transportation vehicles.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A through FIG. 4D illustrate example flows for range data processing.

DETAILED DESCRIPTION

Figure 1:
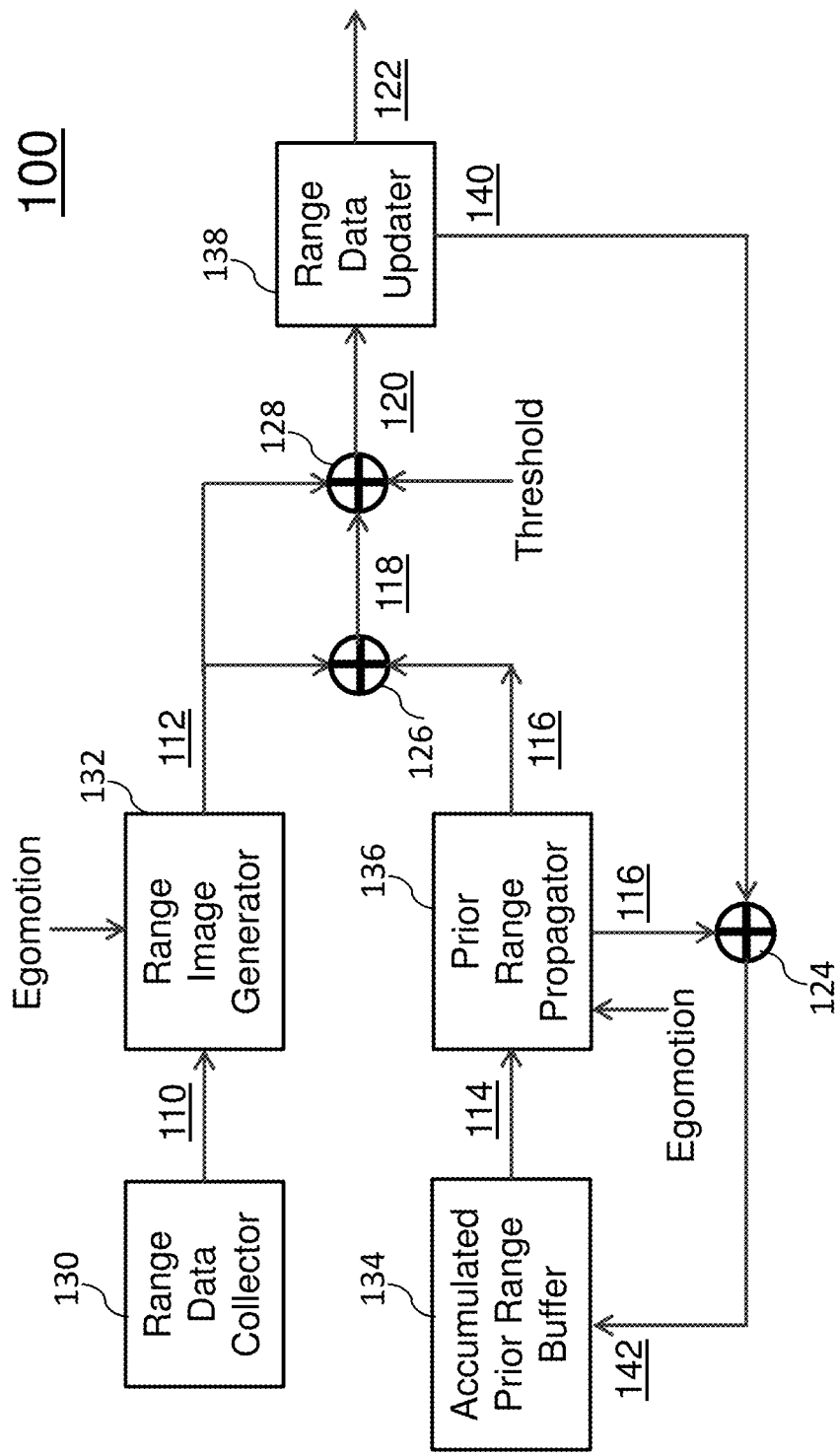
FIG. 1 is an illustrative view of various aspects of an example range data conversion compression system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
- 1.0. General Overview
- 2.0. Structural Overview
- 2.1. Similarity Measure
- 2.2. Egomotion Estimation
- 2.3. Range Data Structures
- 2.4. Range Data Collector
- 2.5. Range Image Generator
- 2.6. Accumulated Prior Range Buffer and Prior Range Propagator in Range Data Transmitting Device
- 2.7. Range Data Updater
- 2.8. Accumulated Prior Range Buffer and Prior Range Propagator in Range Data Receiving Device
- 2.9. Miscellaneous
- 3.0. Functional Overview
- 3.1. Range Data Conversion and Compression
- 3.2. Input Conversion
- 3.3. Egomotion Correction
- 3.4. Propagation of Accumulated Data
- 3.5. Gap/Hole Filling
- 3.6. Range Data Resampling
- 3.7. Range Data Comparison and Compression
- 3.8. Compressed Range Data Accumulation
- 3.9. Decompressing and Reconstructing Range Data
- 4.0. Example Process Flows
- 5.0. Implementation Mechanism—Hardware Overview
- 6.0. Extensions and Alternatives

1.0. General Overview

Techniques for live point cloud compression with egomotion propagation as described herein can be implemented with a wide variety of range data sensors in a wide variety of mapping applications. For example, these techniques can be used to support robust sensing of a 3D space such as a driving environment in an autonomous driving mapping application.

In many operational scenarios, raw or source range data may be continuously acquired in real time by a multitude of range data sensors mounted on or with a vehicle, thereby giving rise to large data sets over time. These large data sets can be used to derive sufficiently dense points or point clouds to accurately map the 3D space, as well as to generate features or input data to train and test artificial intelligence (AI) or machine learning (ML) models implementing autonomous driving.

Under techniques as described herein, large amounts of real time source range data continuously outputted by the sensors can be excluded at or near the sensors at the edge of a range data network comprising range data transmitter(s), range data receiver(s), range data application systems, and so forth.

The source range data can be assembled into densely packed cells in regularized cell array patterns or formats that support relatively high range data accuracies (e.g., 32 bits, 64 bits, etc.). The source range data may be input converted, egomotion corrected and resampled so that resultant (resampled, egomotion corrected input converted) range data in different cells correspond points at different orientation angles respectively indicated or implied by indices of the cells. As a result, there is no need for an upstream range data transmitter to signal explicit orientation angles to a range data receiver.

In addition, prior range data that has been transmitted from the range data transmitter to the range data receiver may be accumulated in a data buffer. The accumulated prior range data can be propagated from a prior time point to a current time point by a 3D transformation and used to determine similarity with respect to current range data derived from the source range data.

Portions of the current range data that are sufficiently similar to portions of the propagated accumulated prior range data can be excluded from being carried by the range data signal. The range data receiver can maintain the same or similar accumulated prior range data from past range data up to the prior time point and perform the same or similar propagation on the accumulated prior range data as the range data transmitter to derive an approximation of the portions of the current range data. Thus, bandwidth usage for conveying relatively accurate range data between different range data processing devices can be significantly reduced, for example by ten times or more.

One or more range data comparison thresholds such as maximum range error threshold(s), minimum range similarity threshold(s) may be used to determine whether a current range in the current range data is sufficiently similar to a propagated accumulated prior range in the propagated accumulated prior range data, and to determine whether the current range should be excluded from being carried in the range data signal. Some or all range data comparison thresholds are user or system configurable, prefixed or dynamically adaptable. As a result, accuracy or precision of each propagated accumulated prior range in a given cell may be collectively or individually controlled to be at least above an accuracy or precision level implemented with the range data comparison thresholds, thereby providing a relatively accurate mapping of moving or stationary objects/structures in the 3D space.

Approaches, techniques, and mechanisms are disclosed for compressing range data. According to one embodiment, a current range data frame is generated for a current time point, the current range data frame including a two-dimensional (2D) array of current range data cells, each current range data cell in the 2D array of cells of the current range data frame including zero or more current ranges, the zero or more current ranges in the current range data cell representing zero or more points in a point cloud in a three-dimensional (3D) space for the current time point. Accumulated prior ranges in an accumulated prior range buffer are propagated from a prior time point to the current time point, the accumulated prior ranges having been accumulated from past range data up to the prior time point, the propagated accumulated prior ranges constituting a set of propagated accumulated prior ranges in a 2D array of accumulated prior range data cells. A set of current ranges in the 2D array of current range data cells is compared with the set of propagated accumulated prior ranges in the 2D array of propagated accumulated prior ranges to determine a set of range differences between the set of current ranges and the set of propagated accumulated prior ranges. A proper subset of current ranges in the set of current ranges is identified based at least in part on the set of range differences. The proper subset of current ranges is included in a range data signal to be transmitted from a range data transmitter to a range data receiver, the range data signal excluding other current ranges in the set of current ranges other than the proper subset of current ranges.

Approaches, techniques, and mechanisms are disclosed for decompressing range data. According to one embodiment, a proper subset of current ranges is decoded, for reconstructing a current range data frame, from a range data signal transmitted from a range data transmitter to a range data receiver, the current range data frame including a set of current ranges to which the proper subset of current ranges belongs, the range data signal excluding other current ranges in the set of current ranges other than the proper subset of current ranges. Accumulated prior ranges in an accumulated prior range buffer are propagated from a prior time point to the current time point, the accumulated prior ranges having been accumulated from past range data up to the prior time point, the propagated accumulated prior ranges constituting a set of propagated accumulated prior ranges in a two-dimensional (2D) array of accumulated prior range data cells. The proper subset of current ranges and the set of propagated accumulated prior ranges are combined into a reconstructed version of the current range data frame. A three-dimensional (3D) space is mapped with a point cloud, the point cloud being constituted with a set of points represented at least in part by a set of ranges in a 2D array of the reconstructed version of the current range data frame.

In other aspects, the invention encompasses computer apparatuses and computer-readable media configured to carry out the foregoing techniques.

2.0. Structural Overview

FIG. 1 is an illustrative view of various aspects of an example system 100 in which the techniques described herein may be practiced, according to an embodiment. The system (100) comprises one or more computing devices and represents a range data transmitter. The one or more computing devices comprise any combination of hardware and software configured to implement the various logical components described herein, including components such as a range data collector 130, a range image generator 132, an accumulated prior range buffer 134, a prior range propagator 136 and a range data updater 138. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

Figure 2:
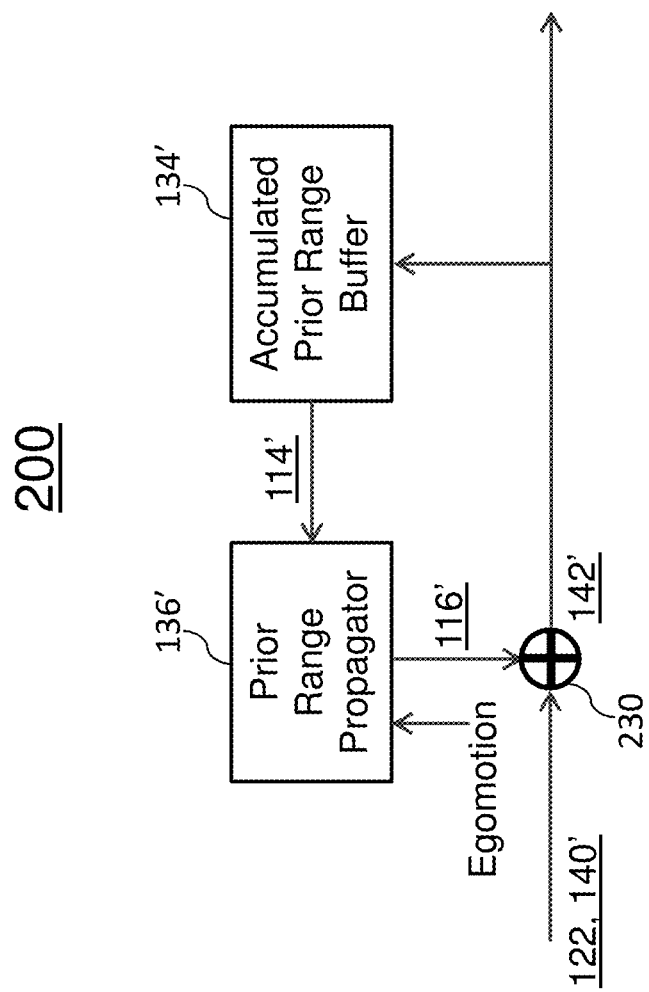
FIG. 2 is an illustrative view of various aspects of an example range data decompression system.

FIG. 2 is an illustrative view of various aspects of an example system 200 in which the techniques described herein may be practiced, according to an embodiment. The system (200) comprises one or more computing devices and represents a range data receiver. The one or more computing devices comprise any combination of hardware and software configured to implement the various logical components described herein, including components such as an accumulated prior range buffer 134' and a prior range propagator 136'. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Similarity Measure

The term "similarity" (or related terms "similar", "different", etc.) may be used herein in regard to comparing two ranges or two sample points in a 3D space. In some operational scenarios, a similarity measure may be specified or determined as follows:

$$\text{Similarity} = (\text{range}A/\text{range}B), \text{ where} \\ (\text{range}A <= \text{range}B) \quad (1)$$

A similarity measure such as in expression (1) above or a different similarity measure may be used, in combination with a minimum similarity threshold, for determining whether a propagated prior range—or a propagated prior sample point in a point cloud that maps the 3D space—is similar to a current range or a current sample point.

If it is determined, based on the similarity measure and the minimum similarity threshold that the propagated prior range is sufficiently similar to the current range, the current range may not need to be provided by a range data transmitter to a range data receiver as the range data receiver may have the prior range and apply a propagation based on egomotion information from the range data transmitter to obtain a sufficiently close reconstructed version of the current range or the current sample point.

On the other hand, if it is determined, based on the similarity measure and the minimum similarity threshold, that the propagated prior data is not similar to the current range, the current range can be transmitted to the range data receiver.

A similarity measure such as in expression (1) above or a different similarity measure may also be used for determining whether two neighbor points are (e.g., likely, above a specific confidence level corresponding to the similarity measure, etc.) a part of the same (e.g., physical, etc.) object/surface. To prevent performing multiple interpolations to create similar points on the same object/surface by an upstream device such as a range data transmitter as described herein, interpolation may be deferred by the range data transmitter to a downstream device such as a range data receiver. If needed, the downstream device can perform these multiple interpolations to create similar points on the same object/structure. The upstream device can just provide two ranges as measured by a double-return ray to enable the downstream device to perform the multiple interpolations deferred by the upstream device.

A ray emitted by a sensor as described herein—e.g., a laser beam, light pulse, light beam, etc.—at a specific direction or orientation defined by a specific azimuth angle and a specific elevation angle may encounter one or more spatial objects/structures that reflect a portion of the ray back to the sensor. As a result, the sensor can receive zero, one, or multiple echoes reflected by zero, one or multiple points of the spatial objects/structures.

An echo may be alternatively referred to as a return. A roundtrip time from a time point at which a ray is emitted by a sensor to a time point at which an echo comprising a portion of the ray is received by the sensor after the echo is reflected from a point in the 3D space can be used to compute a range (or distance) of the point (or point sample) from which the sensor emitting the ray.

The ray is a single-return ray when the ray produces a single echo. This may occur when the ray encounters a front facing surface of an object/structure. The single echo or return corresponds to (a measurement of) a single range by the ray.

The ray is a dual-return ray when the ray produces two echoes. This may occur when the ray encounters an edge of an object/structure. The two echoes or returns correspond to two (measurements of) ranges by the ray.

The ray is a multiple-return ray when the ray produces two or more echoes. This may occur when the ray encounters a slanted surface of an object/structure. The multiple echoes or returns correspond to multiple (measurements of) ranges by the ray.

The ray is a zero-return ray when the ray does not encounter any reflective point in the 3D space such as when the ray aims at a point of sky. In some operational scenarios, a maximum allowable echo time may be set such that any echo or return beyond the maximum allowable echo time is deemed as no echo. As a result, there is no range for the ray. Alternatively, a range is set to infinite, or a maximum allowed ceiling value.

Similarities computed from ranges as measured by a ray's echoes or returns, along with a count of these ranges, may be used to infer or determine what type and/or orientation of spatial object/structure is encountered by the ray.

Additionally, optionally or alternatively, the similarities and/or the count of these ranges may be used (as analog measurements rather than true or false) to infer or determine whether these ranges are (e.g., likely, with a confidence level corresponding to the similarity measure, etc.) from the same surface of an object/structure or different surfaces of different objects/structures.

It should be noted that, in some operational scenarios, other ways of calculating or measuring similarity may also be used in place of or in addition to the similar measure in expression (1) above. For example, another example similarity measure may be specified or determined as follows:

$$\text{Similarity}=(1-|\text{range}A-\text{range}B|/(\text{range}A+\text{range}B)) \quad (2)$$

A similarity measure may be selected based on a number of similarity measure selection factors including but not limited to any of: simplicity, scalability with data values such as range values, whether a similarity measure is symmetric to values to be compared, whether the similarity measure can be used to create or generate a uniform distribution of the same noise level for both near and far objects in the polar view or representation of the 3D space, whether possible values of a similarity measure can be normalized into a specific numeric value range, etc.

For example, both ranges and range differences among samples (or returns) for the near objects may be small, whereas both ranges and range differences among samples (or returns) for the far objects may be larger. Thus, a similarity measure defined as a ratio of two ranges leads to a noise level for the near objects to be proportional to the small range. Likewise, the same similarity measure defined as a ratio of two ranges leads to a noise level for the far objects to be proportional to the larger range. As a result, scales or magnitudes of the ranges may not matter to the noise levels in the similarity values as computed as range ratios, regardless of whether these noise levels in the similarity values are for the near objects or for the far objects.

In some operational scenarios, simplicity of similarity measures may be evaluated at least in part in terms of numbers and/or complexities of computational steps. Scalability may be evaluated at least in part by determining whether points on a surface or incline of a given slope leads to the same similarity measure (values) as neighboring points on the surface of incline, or whether a similarity measure (or its corresponding values) is capable of indicating points are far or close with one another or in reference to a reference point or object/structure in the 3D space. Existence of symmetry with respect to a similarity measure may be evaluated at least in part by determining whether the similarity measure yields the same value regardless of whether it is rangeA or rangeB representing the point in question that invokes a similarity comparison of rangeA or rangeB, for example in expression (1) or (2) above.

2.2. Egomotion Estimation

Egomotion refers to (e.g., physical, spatial, linear, angular, etc.) motion made by a sensor (e.g., a range sensory device, a source range data acquisition device, etc.), for example in a transportation vehicle. Example egomotion may include, but is not necessarily limited to only, any combination of one or more of: linear motion of a sensor such as caused by a vehicle moving along a relatively straight line, vibrations or shakings such as caused by traveling on an uneven road, rotations such as caused by a vehicle turning directions, etc. Egomotion may be characterized, specified or derived as a ratio of the change (DeltaPose) in sensor/vehicle poses over the change in time (DeltaTime) between two time points (or instants in time). This may be referred to as an average rate of change in poses between the two time points. Additionally, optionally or alternatively, egomotion may be specified or derived as an instantaneous rate of change in poses when the two time points approaches infinitely close to each other. The instantaneous rate of change in poses for the sensor may be derived with a time derivative of time varying poses of the sensor at a specific time point. The sensor's egomotion (e.g., average or instantaneous rate of change in poses, etc.) may be denoted as "PoseRate".

Egomotion estimation can be performed to propagate a range corresponding to an earlier time point to (an estimate of) of a range corresponding to a later time point. To propagate earlier range data into later range data, a transformation in up to six dimensions (6D) may be generated based on an applicable PoseRate and a time difference between the earlier and later time points. Here, the applicable PoseRate characterizes some or all of changes in up to three dimensional positions and up to three dimensional orientations (or angles), of a sensor or transportation vehicle used to acquire the earlier or later range data in a 3D space. In some operational scenarios, these up to 6D transformations are applied to prior ranges or points on stationary objects/structures represented in a prior range data frame to generate estimation of current ranges or points on stationary objects/structures at the later time point, even when the sensors or transportation vehicle is moving between the earlier time point and the later time point. The estimation of the current ranges or points can be compared with corresponding ranges or points (e.g., with the same orientations, etc.) represented in a current range data frame to determine similarities—which measure how well the estimation of the current ranges/points is aligned with the current ranges/points acquired by the sensor for the later time point—between the current ranges/points and the estimation of the current ranges/points. Example stationary objects/structures (e.g., cars, building, people, rigid or relatively slowly deformed obstacles, etc.) may include, but are not limited to: moving or non-moving objects/structures with stationary or rigid shapes, forms and/or contours; moving or non-moving objects/structures with slowly changing shapes, forms and/or contours (e.g., the shapes, forms and/or contours may have no or little change over a measurement period, between two adjacent range data frames, etc.). Additionally, optionally or alternatively, current ranges or points as measured with non-stationary objects/structures by the sensor may be transmitted from the range data transmitter to the range data receiver rather than being omitted by the range data transmitter in the range data signal. Any prior data relating to the non-stationary objects/structures may not be efficiently or effectively compared with currently measured range data due to the non-stationarity of shapes, forms and/or contours of the non-stationary objects/structures. Thus, the current range data for the non-stationary objects/structures may not be efficiently or effectively estimated from the accumulated prior data. Example non-stationary objects/structures (e.g., tree leaves, water reflection, water wave, snow, rains, etc.) may include, but are not not limited to: moving or non-moving objects/structures with no established shapes, forms and/or contours; moving or non-moving objects/structures with relatively fast changing shapes, forms and/or contours.

Real-time or near-real-time motion sensory data for determining egomotion such as PoseRate may be measured or collected by the sensor or an attendant motion estimation device operating with the sensor. In some operational scenarios, some or all of the real-time or near-real-time motion sensory data may be measured or collected by one or more external sources outside the sensor. The external sources can provide real-time or near-real time motion information and/or egomotion estimation to a range data processing device such as a range data transmitter.

Egomotion can be estimated or determined in a variety of ways using any combination of one or more of a variety of sensors. In some operational scenarios, egomotion is (e.g., directly, etc.) computed or estimated using an iterative closest point (ICP) algorithm/method that match point clouds between two successive range data frames (e.g., two successive LiDAR frames, etc.), In some operational scenarios, egomotion is estimated or derived from an inertial navigation system using Global Positioning System (GPS), Inertia Measurement Unit (IMU), etc.

For the purpose of illustration only, it has been described that egomotion of the sensor can be estimated or determined using ICP, GPS or IMU. It should be noted that, in various embodiments, these and other algorithms/methods may be used to estimate egomotion.

2.3. Range Data Structures

A range data processing system—including but not limited to a range data acquisition device, a range data collection device, a range data transmitting device, a range data receiving device, a range data compression device, a range data decompression device, a range data application device, etc.—may implement a number of data structures to be used to help carrying out range data processing operations, processes, methods and/or algorithms.

By way of illustration but not limitation, a first example data structure may be denoted as "RangeImage." This data structure provides a relatively efficient predicable format to maintain, cache and/or store input data generated from decompressing compressed data received by a range data receiver or output data to be compressed and transmitted in a compressed range data signal (e.g., a signal comprising a series of data packets, a bitstream comprising a series of coded bits, etc.) by a range data transmitter to the range data receiver.

The "RangeImage" data structure comprises a header denoted as "RangeImageHeader" and a two-dimensional (2D) array of cells denoted as "RangeImageSample[sizeY][sizeX][2]", where "sizeY" denotes the total number of columns in the 2D array, "sizeX" denotes the total number of rows in the 2D array, and the numeral "2" indicates up to two samples (e.g., returns, ranges, points, etc.) are stored in a single cell. It should be noted that in other operational scenarios, a "RangeImage" data structure may be defined to store more than two samples in a single cell.

The cells in the 2D array in the "RangeImage" data structure are used to store individual ranges or samples of individual points in a point cloud of a 3D space. Each cell in the 2D array is assigned an individual distinct cell index (or position) such as row and column. A cell index (or position) implies or indicates a corresponding (ray) angle covered by a light ray emitted by the sensor to probe reflectivity of points of objects/structures in the 3D space.

Roundtrip times of echoes or returns (e.g., caused by the reflectivity of the points, etc.) from these probed points can be used to compute or measure individual ranges of these points. A cell (e.g., up to two returns each, etc.) in the 2D array in the "RangeImage" data structure may comprise a number of cell data fields (or respective cell data field values). Example cell data fields for a cell as described herein may include but are not necessarily limited to only, any of: range(s) (e.g., each range in 16 bits, in units of centimeters, etc.), reflectivity (e.g., measuring how strong a point is capable of reflecting light, in 8 bits, range from 0 to 128, range from 0.0 to 1.0, with a special value of 255 reserved to indicate the point as a retro-reflector, etc.), latency (e.g., 8 bits, in 0.1 second/256 quantization steps, etc.), and so forth.

The header ("RangeImageHeader") in the "RangeImage" data structure is used to store information for converting between (ray) angles and cell indexes of cells in the 2D array of cells. Additionally, optionally or alternatively, the header ("RangeImageHeader") may comprise header data fields (or respective header data field values) used to determine effects of egomotion on range data samples captured in the cells of the 2D array or in a range data frame derived from the cells of the 2D array. Example header data fields may include, but are not necessarily limited to only, some or all of: a timestamp (e.g., indicating a start time point from which the range data samples are acquired, etc.), a vehicle pose rate denoted as "VehiclePoseRate", or other data fields such as "SensorMounting", etc.

The "SensorMounting" data field indicates a spatial position and/or a spatial orientation of the sensor, for example mounted in a vehicle. When multiple sensors are deployed or mounted in a vehicle, each sensor may have its respective spatial position and/or spatial orientation. The spatial orientation of the sensor may or may not be in the same direction as that of the egomotion of the sensor. For example, the egomotion of the sensor may be the same as the motion of the vehicle on which the sensor is mounted. The spatial orientation of the sensor—where the sensor is facing—may be toward the side of vehicle orthogonal to the direction of the egomotion. The spatial position and/or the spatial orientation of the sensor may be used to transform spatial information such as ranges of points from one coordinate system (e.g., a coordinate system stationary to the vehicle or the sensor, a relative coordinate system, etc.) to another coordinate system (e.g., a coordinate system stationary to the road or environment in which the (moving) vehicle is in, the World coordinate system, etc.).

A second example data structure used by a range data processing system as described herein may be denoted as "RangeImageExtras." This data structure can provide a relatively precise version of range data as compared with corresponding range data represented in the "RangeImage" data structure. For example, the "RangeImageExtras" data structure may comprise floating point data field values and/or floating point data sample values with relatively high precisions (or within relatively low error tolerances) as compared with data field values and/or data sample values (e.g., in integer quantization with quantization errors instead of floating point values, etc.) represented with the "RangeImage" data structure.

The "RangeImageExtras" data structure may be internally used, for example to internally track a precise, intermediate version of egomotion corrected current points or propagated prior points, in a range data processing device as described herein, whereas the "RangeImage" data structure may be used to convey information—to be compressed or generated from decompressing compressed data—between or among range data processing devices.

In some operational scenarios, the "RangeImageExtras" data structure comprises a header denoted as "RangeImageHeader" and a two-dimensional (2D) array of cells denoted as "RangeImageSampleExtras[sizeY][sizeX][2]".

The header ("RangeImageHeader") in the "RangeImageExtras" data structure may, but is not limited to, include some or all information (e.g., in the same precision, in a different precision, a timestamp in microseconds since the Unix epoch, etc.) represented in the "RangeImageHeader" header of a corresponding "RangeImage" data structure. As used herein, an instance of the "RangeImageExtras" data structure and an instance of the "RangeImage" data structure correspond to each other if both instances refer to the same time point—e.g., at which range data samples in the instances of the "RangeImageExtras" and "RangeImage" data structures are acquired.

The cells in the 2D array "RangeImageSampleExtras" in the "RangeImageExtras" data structure may, but is not limited to, include some or all information (e.g., in the same precision, in a different precision, etc.) represented in the cells in the 2D array "RangeImageSample" of the corresponding "RangeImage" data structure.

A cell in the 2D array ("RangeImageExtras") may comprise cell data fields (or respective cell data field values) including but not limited to some or all of: azimuth (e.g., floating point values, etc.), elevation (e.g., angles explicit and precise—not simply implied by cell index, etc.), unit position (e.g., position kept or represented as a vector, etc.), range (e.g., range times unit position to a 3D position of the point represented by the cell, etc.), reflectivity (e.g., 0.0 to 1.0 with 1.99 reserved to indicate a retroreflector at the point represented by the cell, etc.), and so forth.

A latency stored or kept with a cell of the "RangeImage" data structure measures elapsed time between the start time point indicated by the timestamp in the header of the "RangeImage" data structure and a later time point at which a ray used to generate returns or samples of the cell is emitted. The later time point may be explicitly computed by adding the latency in the cell to the start time point or the timestamp in the header of the "RangeImage" data structure. This explicitly computed later time point may be directly stored or kept in the cell in the "RangeImageExtras" data structure.

A third example data structure used by a range data processing system as described herein may be denoted as "CompressedData", which may store compressed range data to be sent in a range data signal over a data communication link from an upstream range data processing device to a downstream recipient range data processing device. Here, the data communication link may be any of: over the air, over the wire, first written to storage and then directly or indirectly provided to a recipient range data processing device, and so forth. Additionally, optionally or alternatively, in some operational scenarios, additional (e.g., lossless, etc.) compression other than what has been compressed by way of the "CompressedData" data structure may be performed by the upstream range data processing device in the process of generating the range data signal.

In some operational scenarios, the "CompressedData" data structure comprises a header denoted as "RangeImageHeader", a first data construct denoted as "CompressedBits", a second data construct denoted as "CompressionValues", etc.

The header ("RangeImageHeader") in the "CompressedData" data structure may, but is not limited to, include some or all information (e.g., in the same precision, in a different precision, a timestamp in microseconds since the Unix epoch, etc.) captured in a header ("RangeImageHeader") of a corresponding "RangeImage" data structure. As used herein, an instance of the "CompressedData" data structure and an instance of the "RangeImage" data structure correspond to each other if they both refer to the same time point—e.g., range data in the instances of the "CompressedData" data structure is derived from range data samples in the instance of the "RangeImage" data structure that are acquired at the time point.

Figure 3:
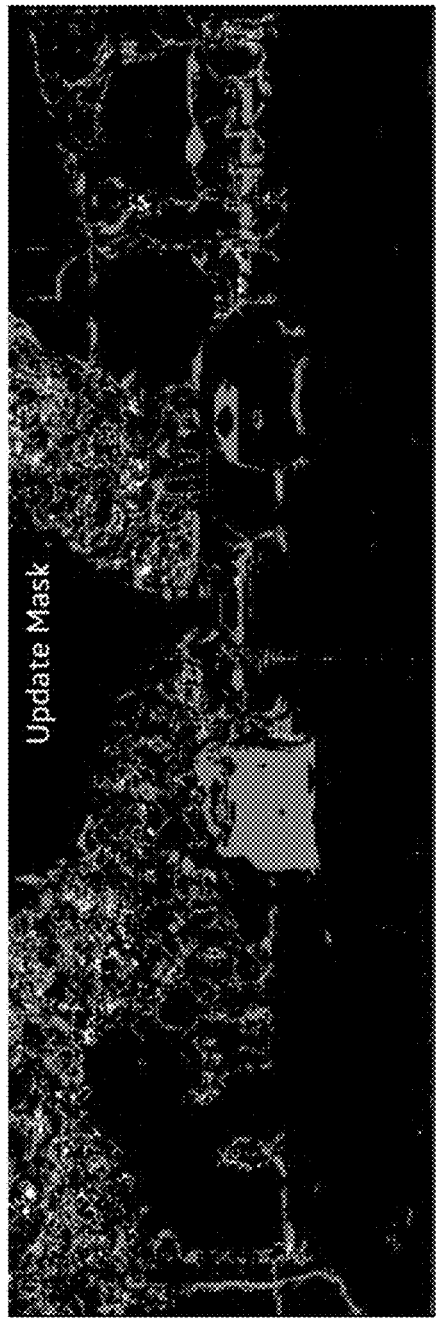
FIG. 3 illustrates an example update mask.

The first data construct "CompressionBits" in the "CompressedData" data structure may comprise a series of 3-bit cells. The series of 3-bit cells in the "CompressedData" data structure may have one-to-one correspondence with some or all of the 2D array of cells in the corresponding "RangeImage" data structure. Each 3-bit cell in the series of 3-bit cells in the "CompressedData" data structure conveys state changes and new data for a respective cell in the 2D array of cells in the corresponding "RangeImage" data structure. In some operational scenarios, the series of 3-bit cells can be used to derive an update mask, as illustrated in FIG. 3, indicating which cells (or which ranges) in the 2D array of cells are to be updated with sample updates and which cells in the 2D array of cells are to be generated from resampling propagated accumulated prior ranges.

The second data construct "CompressionValues" comprises a list of changed samples or ranges denoted as "RangeImageSamples" for cells that need to be updated with the new samples or ranges. To-be-updated cells may be identified and arranged in the list of changed samples or ranges in the same order as these cells are indicated by the series of 3-bit cells in the first data construct "CompressionBits". If a 3-bit cell in the series of 3-bit cells in the "CompressedData" data structure indicates that the cell has new sample(s) or new range(s) to be transmitted from the upstream device to the downstream device, a corresponding to-be-updated cell in the list of changed samples or ranges in the "CompressedData" data structure stores the new sample(s) or the new range(s).

These and other data structures may be implemented by a range data processing system as described herein to help carrying out range data processing operations, processes, methods and/or algorithms.

2.4. Range Data Collector

The system (100) comprises a range data collector 130 that collects raw sensory data such as start time points for data acquisition cycles, roundtrip times, latencies, orientations, etc., in connection with echoes or returns of rays emitted from one or more range data sensors (e.g., LiDAR sensors, non-LiDAR sensors, etc.). These range data sensors may be rigidly disposed with or mounted to a vehicle or a sensor hosting structure. Individual relative positions such as "SensorMount" data field values of the sensors may be maintained by the range data collector (130). The range data collector (130) may operate with one or more motion sensors to estimate or determine egomotion such as PoseRate of a given sensor at a given time point, for a given time period/interval/duration within a data acquisition cycle, etc. As used herein, a data acquisition cycle may refer to a time difference between a preceding range data frame and a succeeding range data frame (e.g., immediately following the preceding range data frame, etc.). A range data frame may refer to an instance of a range data structure as described herein. Additionally, optionally or alternatively, a range data frame may refer to a digital data transmission unit such as carried in a packet in computer/network communication; the frame may serve as a container or envelop for a range data structure (or an instance thereof) as described herein.

The range data collector (130) may be continuously outputting source range data 110 in real time or in near real time to other parts of the system including but not limited to the range image generator (132). Example source range data may include, but is not necessarily limited to only, some or all of: source ranges or samples representing points of a 3D space as acquired by a given sensor, egomotion of the sensor such as PoseRate, timing information such as latencies and start time point for a data acquisition cycle or a source range data frame, angle information related to the source ranges or samples, and so forth. Some or all of the real-time or near-real-time source range data (110) may be packaged or represented in a source range data frame, such as an original source range image.

2.5. Range Image Generator

The system (100) comprises a range image generator 130 that receives the source range data (110) collected by the sensor (e.g., one of the sensors mounted with a vehicle, each of some or all the sensors mounted with a vehicle, etc.), the egomotion of the sensor, etc. The egomotion of the sensor may be provided along with the source range data (110) by the range data collector (130). Additionally, optionally or alternatively, the egomotion of the sensor may be provided separately from the source range data (110), for example by an external motion sensor operating in conjunction with the sensor or the range data processing system (100).

The range image generator (132) can (e.g., continuously, in real time, in near real time, etc.) perform a number of range data processing operations to generate a current range data frame 112 for a current time point, which may represent the most recent frame time point for which range data is to be compressed into a range data signal outputted by the range data processing system (100). The current range data frame (112) for the current time point may be represented with an instance (denoted as "current instance") of the "RangeImageExtras" data structure.

The current range data frame (112) may be generated by the range image generator (132) from source range data in a corresponding current source range data frame that stores source ranges or samples and other related source range data received with the source range data (110). The current source range data frame received with the source range data (110) for the current time point may be represented with an instance (denoted as "current instance") of the "RangeImage" data structure.

The range data processing operations performed by the range image generator (132) in connection with generating the current range data frame for the current time point may include, but are not limited to, applying egomotion correction to the source range data received in the current source range data frame to align timewise all the samples or points in the current range data frame (112)—which correspond to source samples or source points in the source range data (110) that may or may not be acquired at the same time point by the sensor—to a common time point such as an end time point of a data acquisition cycle used to acquire the corresponding source samples or source points in the source range data (110) by the sensor.

Additionally, optionally or alternatively, the range data processing operations performed by the range image generator (132) in connection with generating the current range data frame for the current time point may also include, but are not limited to, applying range data resampling to the egomotion corrected current range data.

The range image generator (132) may be continuously outputting current range data frames for a series of successive current (frame) time points—including the current range data frame (112) for the current time point in the present example—in real time or in near real time to other parts of the system (100).

2.6. Accumulated Prior Range Buffer and Prior Range Propagator in Range Data Transmitting Device The system (100) comprises an accumulated prior range buffer 134 that accumulates prior range data 114 up to a specific time point such as a previous (frame) time point immediately preceding the current (frame) time point, and a prior range propagator 136 that uses the applicable egomotion—which may be different from or the same as the egomotion used to perform the egomotion correction on the current source range data (110)—to generate propagated accumulated prior range data by propagating the accumulated prior range data (114) maintained in and provided by the buffer (134) from the previous (frame) time point to the current (frame) time point.

The prior range propagator (136) generates resampled propagated accumulated prior range data (116) by applying range data resampling operations to the propagated accumulated prior range data. The prior range propagator (136) may store or cache the resampled propagated accumulated prior range data (116) in an instance (e.g., a resampled propagated instance, etc.) of the "RangeImageExtras" data structure. Likewise, the accumulated prior range data (114) may also be stored, cached or buffered as an instance (e.g., a pre-propagated instance, a buffered instance, etc.) of the "RangeImageExtras" data structure.

The prior range propagator (136) may be continuously outputting resampled propagated accumulated prior range data frames for a series of successive current (frame) time points—including the resampled propagated accumulated prior range data frame (116) for the current time point in the present example—in real time or in near real time to other parts of the system (100).

2.7. Range Data Updater

The system (100) comprises a range data updater 138 that receives processed range data 120 and generates compressed range data to be included, along with data field values specifying the egomotion, in a range data signal 122. The range data signal (122) may be directly or indirectly transmitted or delivered by a range data transmitter such as the system (100) to a range data receiver such as the system (200).

As illustrated in FIG. 1, the current range data frame (112) and the resampled propagated accumulated prior range data frame (116) may be received by a range data difference operator 126 to generate a range data difference image/frame 118. For example, current ranges or current samples in each cell of the current range data frame (112) may be compared with resampled propagated prior ranges or resampled propagated prior samples in a respective cell of the resampled propagated accumulated prior range data (116) by the range data difference operator (126) to generate range data (value) differences between the current ranges/samples and the resampled propagated prior ranges/samples and to store the range data (value) differences in a corresponding cell of the range data difference image/frame (118).

The current range data frame (112) and the range data difference image/frame (118) may be received by a range data thresholding operator 128 to generate an intermediate range data frame 120. For example, current ranges/samples in each cell of the current range data frame (112) and (value) differences in a corresponding cell (e.g., with the same cell index/position of the cell in the current range data frame (112), etc.) of the range data difference image/frame (118) may be used to establish, compute or derive (e.g., percentile, etc.) errors of the resampled propagated prior ranges/samples in reference to the current ranges/samples. For example, the errors may be computed by dividing the (value) differences in the cell of the range data difference image/frame (118) with the current ranges/samples in each cell of the current range data frame (112).

Additionally, optionally or alternatively, instead of or in addition to computing errors, similarities between resampled propagated prior ranges/samples in a corresponding cell (e.g., with the same cell index/position of the cell in the current range data frame (112), etc.) of the resampled propagated prior range data frame (116) and the current ranges/samples in each cell of the current range data frame (112) may be computed.

The range data thresholding operator 128 compares a maximum error threshold (or a minimum similarity threshold) to errors (or similarities) computed for resampled propagated prior range data in the resampled propagated prior range data frame (116) in reference to current range data in the current range data frame (112). The range data thresholding operator (128) generates indicators to identify specific resampled propagated prior ranges (and/or specific cells) that have errors no more than the maximum error threshold (or similarities no less than the minimum similarity threshold). The intermediate range data may also include (to-be-updated) current ranges/samples (and/or to-be-updated cells) which correspond to resampled propagated prior ranges (and/or specific cells) that have errors more than the maximum error threshold (or similarities less than the minimum similarity threshold).

The indicators and the (to-be-updated) current ranges samples (and/or the to-be-updated cells as determined or identified by the thresholding operator (120) may be included in the intermediate range data frame (120) for the current time point.

In various operational scenarios, the maximum error threshold (or the minimum similarity threshold) may be fixed, adaptively changeable, preconfigured, dynamically configurable at run time, etc. These thresholds may be used to control accuracies of individual ranges/samples represented in a range data signal provided by the upstream device to a downstream recipient device. Example maximum error threshold values may include, but are not necessarily limited to only, any of: 1%, 2%, 3%, 4%, 5%, etc. Example minimum similarity threshold values may include, but are not necessarily limited to only, any of: 99%, 98%, 97%, 96%, 95%, etc.

Based on the intermediate range data frame (120) for the current time point, the range data updater (138) generates a current compressed range data frame—e.g., a current instance of the "CompressedData" data structure—as a part of the compressed range data to be included in the range data signal (122).

The range data updater (138) may be continuously outputting compressed range data frames for a series of successive current (frame) time points—including the current compressed range data frame for the current time point in the present example—in real time or in near real time in the range data signal (122).

New ranges/samples 140 as generated by the range data updater (138) of the system (100) in the current compressed range data frame for the current (frame) time point may be combined or summed with the resampled propagated prior range data (116) in the current resampled propagated prior range data frame for the current (frame) time point to generate or assemble a reconstructed version 142—such as a reconstructed (or compressed) range image—of a current range data frame (in the upstream device) for the current (frame) time point. The reconstructed version (142) of the current range data frame is the same as or approximates the current range data frame. In the reconstructed version (142) of the current range data frame, the cells contain either resampled propagated prior range data (when errors or similarities in the resampled propagated prior range data are deemed satisfactory based on error or similarity threshold) or the new range samples (140) (when errors or similarities in the resampled propagated prior range data are deemed unsatisfactory based on error or similarity threshold). The new ranges/samples (140) in the reconstructed version (142) of the current range data frame may be used to update the buffer (134) while leaving cells not related to the new ranges/samples (140) to be populated by the resampled propagated prior range data in the reconstructed version (142) of the current range data frame.

2.8. Accumulated Prior Range Buffer and Prior Range Propagator in Range Data Receiving Device The system (200) (e.g., continuously, in real time, in near real time, etc.) receives range data updates in the range data signal (122) and demultiplexes/decodes the range data signal (122) into the series of compressed range data frames for a series of (frame) time points and a corresponding series of egomotion values for the series of (frame) time points. Each egomotion value in the series of egomotion values included in the range data signal (122) by the system (100) may correspond to a respective (frame) time point in the series of (frame) time points and specify egomotion for a respective compressed range data frame (in the series of compressed range data frames) for the respective (frame) time point.

Similar to the system (100), the system (200) comprises an accumulated prior range buffer 134' that accumulates prior range data 114' up to a specific time point such as a previous (frame) time point immediately preceding a current (frame) time point, and a prior range propagator 136' that uses applicable egomotion—which may be specified by a current egomotion value in the series of egomotion values received by the system (200) in the range data signal (122)—for the current time point to generate propagated accumulated prior range data by propagating the accumulated prior range data (114') maintained in and provided by the buffer (134') from the previous (frame) time point to the current (frame) time point.

The prior range propagator (136') generates resampled propagated accumulated prior range data (116') by applying range data resampling operations to the propagated accumulated prior range data. The prior range propagator (136') may store or cache the resampled propagated accumulated prior range data (116') in an instance (e.g., a resampled propagated instance, etc.) of the "RangeImageExtras" data structure. Likewise, the accumulated prior range data (114') may also be stored, cached or buffered as an instance (e.g., a pre-propagated instance, a buffered instance, etc.) of the "RangeImageExtras" data structure.

New ranges/samples 140' as generated by the range data updater (138) of the system (100) in the current compressed range data frame for the current (frame) time point may be combined or summed with the resampled propagated prior range data (116') in the current resampled propagated prior range data frame for the current (frame) time point to generate or assemble a reconstructed version 142' of a current range data frame (in the upstream device) for the current (frame) time point. The reconstructed version (142') of the current range data frame is the same as or approximates the current range data frame, subject to quantization/coding errors involved in compression/decompression operations. In the reconstructed version (142') of the current range data frame, the cells contain either resampled propagated prior range data (when errors or similarities in the resampled propagated prior range data are deemed satisfactory based on error or similarity threshold) or the new range samples (140') (when errors or similarities in the resampled propagated prior range data are deemed unsatisfactory based on error or similarity threshold). The new ranges/samples (140') in the reconstructed version (142') of the current range data frame may be used to update the buffer (134') while leaving cells not related to the new ranges/samples (140') to be populated by the resampled propagated prior range data in the reconstructed version (142') of the current range data frame.

The system (200) may be continuously outputting a series of reconstructed range data frames for the series of successive current (frame) time points—including the reconstructed version (112') of the current range data frame for the current (frame) time point in the present example—in real time or in near real time. Range data in the reconstructed (or re-assembled) range data frames may, but is not limited to, be used to support mapping applications, autonomous driving applications, assisted driving applications, and so forth.

2.9. Miscellaneous

The systems (100 and 200) illustrate only one of many possible arrangements of components configured to provide the functionality described herein. Other arrangements may include fewer, additional, or different components, and the division of work between the components may vary depending on the arrangement.

3.0. Functional Overview

In an embodiment, some or all techniques and/or methods described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Range Data Conversion and Compression

Figure 4A:
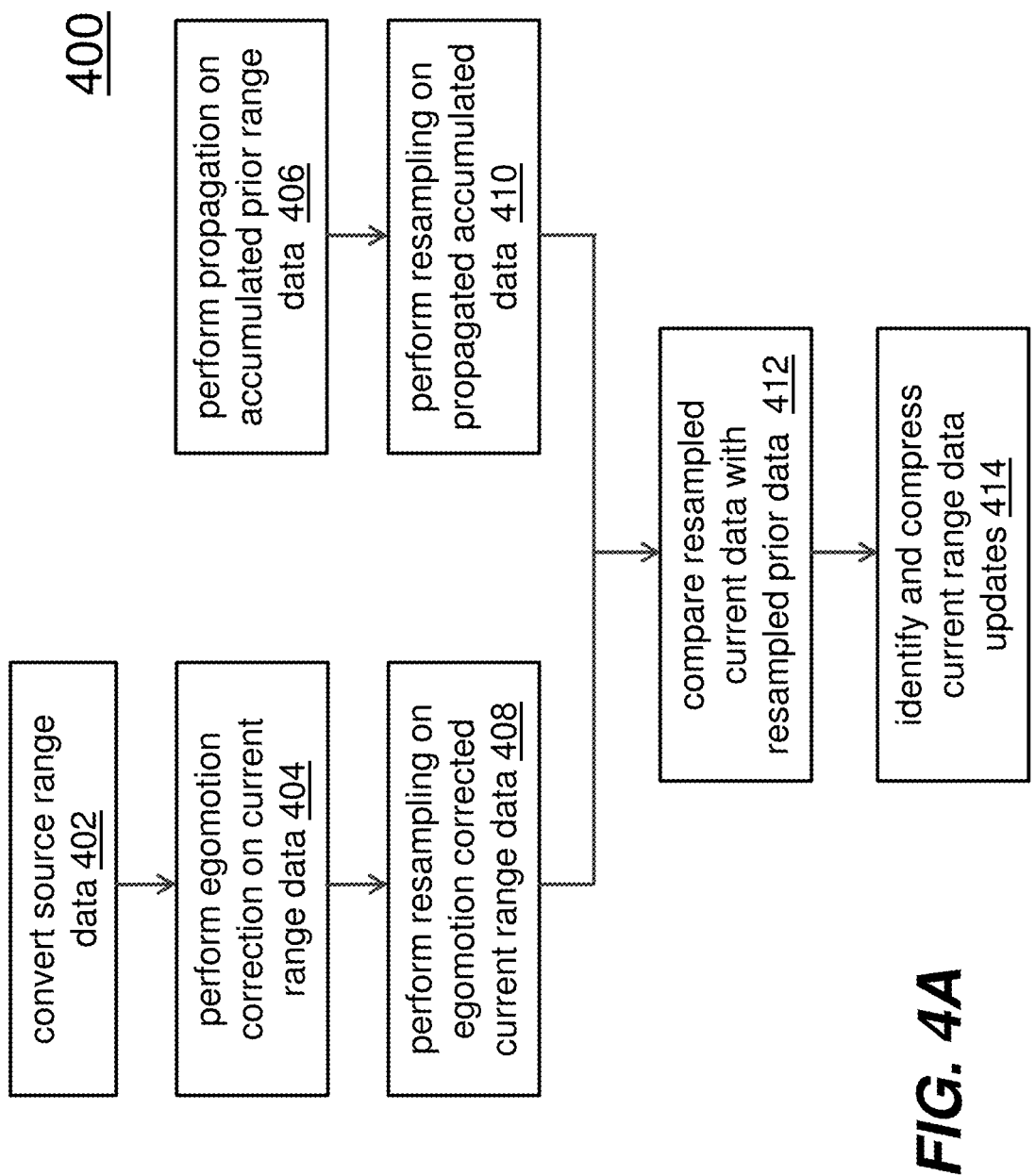

FIG. 4A illustrates an example processing flow 400 for range data conversion and compression, according to an embodiment. The various elements of flow 400 may be performed in a variety of systems (e.g., one or more classical computing devices, etc.), including systems such as the system (100) described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow (400) illustrates but one example flow for range data conversion and compression. Other flows may involve additional or fewer steps, in potentially varying arrangements.

The flow (400) may be used to derive a single current (processed) range data frame for a current time point from a combination of current source range data, accumulated prior range data and applicable egomotion applicable to the current time point.

The current source range data may be (e.g., the latest, the most recent, etc.) source range data acquired by a range data sensor as described herein and represented in a current source range data frame.

The accumulated prior range data may be represented in (an instance of) an accumulated "RangeImageExtras" data structure corresponding to a preceding (e.g., the last processed, etc.) range data frame for a preceding (frame) time point immediately before the current (frame) time point.

In various embodiments, the applicable egomotion may be estimated or derived as average or instantaneous linear and/or angular velocity vector(s) representing temporal rates of change in linear positions and/or angular positions of the sensor for the current time point, the preceding (frame) time point, a time point in between the preceding and current (frame) time points, a time interval between the preceding and current (frame) time points, and so forth.

The flow (400) can be continuously and repeatedly executed to derive a series of (processed) range data frames for a series of consecutive (frame) time points corresponding to a series of source range data frames acquired in real time or in near real time for the series of consecutive (frame) time points.

In some operational scenarios, the processing flow (400) is enabled with the above mentioned combination as input with no or little additional input data, aside from input operational parameters to the process flow (400) for controlling quality of compressed data generated from the processing flow (400).

Source range data as described herein may be specific to, or dependent on, a specific model and/or a specific maker of a range data sensor used to collect or acquire the source range data. Additionally, optionally or alternatively, the source range data may be general to, or independent of, specific models and/or specific makers of range data sensors.

In some operational scenarios, a range data sensor may scan (or snap a "picture" of range information) of a 3D space or a point cloud therein at the same time without performing horizontal or vertical scanning. In some operational scenarios, a range data sensor may scan a 3D space or a point cloud therein horizontally in vertical succession over a finite time interval (e.g., milliseconds, etc.). In some operational scenarios, a range data sensor may scan a 3D space or a point cloud therein vertically in horizonal succession over a finite time interval (e.g., milliseconds, etc.). In some operational scenarios, a range data sensor may scan a 3D space or a point cloud therein in a regularly spaced grid. In some operational scenarios, a range data sensor may scan a 3D space or a point cloud therein in a more random pattern than a regularly spaced grid pattern.

For the purpose of illustration only, source range data may be generated from a sensor executing a raster scanning process in which range data scanning of a 3D space are made with horizontal scanlines with vertical succession. It should be noted that, in various embodiments, any combination of this and/or other ways of source range data acquisition processes may be used by a sensor as described herein to acquire source range data with respect to a 3D space.

3.2. Input Conversion

Block 402 comprises performing input conversion on source ranges (e.g., samples, point samples, points, etc.) in the source range data collected or acquired for the current time point by the sensor into a general format independent of specific makers and/or models of sensors. This can help make the compression algorithm work generally or generically, regardless of which type of range data sensor or which type of range data source is used to acquire or provide the source range data.

The input conversion transforms the source ranges collected or acquired for or at the current time point into (input converted) ranges (e.g., samples, point samples, points, etc.) of a current instance of the "RangeImage" data structure for the same time point. For the purpose of illustration only, the "RangeImage" data structure captures (input converted) ranges in a regularized grid pattern—e.g., formed by a plurality of rectangles or squares—represented by a 2D array of cells. Each cell in the 2D array of cells may, but is not limited to, include: two ranges (depths) of up to two points, reflectance or reflectivity of each of the points represented in the cell, etc.

In some operational scenarios, a 3D position of the point represented in a cell may be determined or specified by (a combination of) a range (e.g., distance from the point to the position of sensor, etc.), an azimuth (e.g., a planar angle of the point in a plane of a reference coordinate system with the position of sensor as the origin of the coordinate system, etc.), and an elevation (e.g., an elevation angle of the point relative to the plane of the same reference coordinate system, etc.). As the cell (or a pixel) may be a non-zero area such as a rectangle or square forming a corresponding solid angle—comprising small contiguous ranges of different azimuth angles and different elevation angles—from the sensor's viewpoint, (ideal) azimuth and elevation angles represented by the cell may be implied, derived, measured and/or estimated as azimuth and elevation angles of a geometric center of the cell (or pixel).

A field of view represented in the (input converted) ranges of the current instance of the "RangeImage" data structure for the current time point may match a field of view represented in the source ranges provided by the sensor.

For each cell, the sensor may acquire zero, one, two or more source ranges (or measurements thereof). The sensor may be one of: a laser based range sensor, a non-laser based range sensor, a combination of laser range sensor and/or non-laser range sensor. In some operational scenarios in which the sensor is a laser based range sensor, any, some or all of the source ranges in each cell may be generated per laser ray emitted by the sensor. In some operational scenarios in which the sensor is a time of flight camera, flash LiDAR, or depth images generated from stereo cameras, ultrasound, or radar, any, some or all of the source ranges in each cell may be generated by the sensor using non-laser based measurement techniques. It should be noted that some or all techniques as described herein including but not limited to range data compression/decompression techniques may be applied to range data generated/derived with laser based range sensors as well as with non-laser based range sensors, so long as the range data such as those represented in (e.g., 2D, 3D, etc.) polar coordinates can be determined for each range value in the range data generated with the laser based sensors and/or the non-laser based sensors. Each cell in the current instance of the "RangeImage" data structure for the current time point may allow up to a certain number (e.g., two, etc.) of ranges to be stored. Keeping a single range per laser ray in each cell may simplify range data processing significantly. Keeping multiple ranges such as two ranges per laser ray in each cell enables better handling of object/structure edges and/or thin objects/structures as a single range may not be sufficient to probe the edges. Keeping two ranges in each cell may be (e.g., generally, etc.) sufficient for many operational scenarios, with no or little additional benefit to be gained by additional ranges in the cell.

Various tradeoffs can be evaluated or made in determining/selecting a specific spatial/angular resolution for (input converted) range data stored in the current instance of the "RangeImage" data structure or the 2D cell array therein. A lower resolution generally results in less data to be transferred within a range data processing device or between different range data processing devices, even though the lower resolution would reduce accuracy of a probed scene in the 3D space, would lead to a lower percentage of valid propagations than otherwise, and would lose meaningful information captured and/or provided by the sensor.

By way of comparison, a significantly higher resolution than a native resolution of the sensor would add significant processing load, would generate a false impression of the quality of range data captured and/or provided by the sensor as limited by its native resolution, and would ultimately increase bandwidth usage (though not necessarily linearly as interpolated points or range values may be relatively efficiently propagated) with no or little additional benefit.

A good trade-off may be to use or select a spatial resolution for range data in the 2D cell array of the "RangeImage" data structure that is comparable to the native resolution of the sensor. This approach for selecting spatial resolution may or may not maintain a consistent angular quantization (e.g., azimuth and elevation separation or spacing between adjacent samples/cells, etc.) represented in the "RangeImage" data structure for all types of range data sensors, as many of these sensors may or may not have matching spatial resolutions and may or may not have matching angular quantizations.

In some operational scenarios, the "RangeImage" data structure comprises square cells in a regularized grid pattern, whereas a sensor may or may not emit laser rays in a regular pattern in which each of the laser rays necessarily corresponds to a square cell of the regular pattern. For example, the sensor (e.g., commercially available from Luminar Technologies, Orlando, Fla., etc.) may emit laser rays along horizonal scanlines taken in vertical succession over a finite time interval. As a result, due to concurrent movements of the sensor over the same finite time interval while the laser rays are emitted, the layer rays may form a time varying warped pattern significantly deviating from a regular pattern.

Input converted ranges in the cells of the current instance of the "RangeImage" data structure are generated from source ranges obtained in measurements with light rays emitted by the sensor. In operational scenarios in which the cells of the current instance of the "RangeImage" data structure not completely spaced or separated in the same way as the source ranges obtained with the light rays, the source ranges may be interpolated (or extrapolated) to generate corresponding (input converted) ranges to be stored in the cells of the current instance of the "RangeImage" data structure.

For example, source ranges along each scanline as acquired by the sensor may be interpolated to generate corresponding candidate ranges stored in cells of a corresponding row in the 2D cell array of the current instance of the "RangeImage" data structure. Candidate ranges in adjacent/neighboring cells in the corresponding row may be obtained by interpolating to adjacent/neighboring azimuth angles separated or spaced consistently to match correct azimuth angle separation or spacing according to the selected spatial resolution of the cells in the 2D array of the current instance of the "RangeImage" data structure. At the same time, the candidate ranges in the cells in the 2D array of the "RangeImage" data structure may be set to the same elevation as the elevation angle of the scanline of the sensor used to acquire the source ranges giving rise to the candidate ranges.

Some or all the source ranges in a plurality of scanlines—spanning a range of elevation angles in a 3D space—from the sensor are converted to a plurality of rows of cells each of which carries or is set to a corresponding elevation of a respective scanline in the plurality of scanlines of the sensor.

Then, for each cell in the current instance of the "RangeImage" data structure, the "best" connecting line between adjacent interpolated scanlines (or rows) above and below the cell is found. The "best" connecting line crosses over the cell. Here, "best" can be determined or selected based on similarity of ranges between range(s) of the cell and (e.g., interpolated, etc.) range(s) of the adjacent interpolated scanlines (or rows).

An elevation that is to be assigned to the cell may be determined based on a combination of the selected spatial resolution of the "RangeImage" data structure, the field of view to be represented in the 2D array of cells of the "RangeImage" data structure, etc. A corresponding (input converted) range that is to be assigned to the cell may be determined as an interpolated value found along the "best" connecting line at the elevation that is to be assigned to the cell.

In operational scenarios in which multiple source ranges per (laser) ray are provided or acquired, similarity measures may be computed among multiple source ranges and used to select or derive one or two best source ranges (or more) to be stored in a cell corresponding to the ray in the current instance of the source range data frame. Each source range may represent a (raw data) sample for a point in a point cloud in a 3D space. The source ranges may have a group or cluster of similar source ranges (or the largest group or cluster among multiple groups or clusters) as indicated by similarities computed from these source ranges. The best source range may be derived as a source range with the best/highest similarity or a range corresponding to a centroid in the group or cluster of source ranges having the highest similarities—for example above a 90% similarity. The next best source range may be derived similarly from remaining source ranges on a basis of having the next highest (or most) similarity to the remaining source ranges—e.g., subject to a constraint such as having less than 90% similarity to the best source range so that the two best source ranges as selected to be stored in the cell are not too close to each other.

The foregoing input conversion relating to generating the current instance of the "RangeImage" data structure for the current time point may be similarly applied to generate a current instance of the "RangeImageExtra" data structure for the current time point, with the latter being a more precise version of range data for a point cloud in a 3D space than the former. Additionally, optionally or alternatively, multiple ranges or multiple points represented in a cell in the "RangeImage" or RangeImageExtra" structure may be stored in a specific order, such as the closet range or point precedes the second closest range or point, and so on.

3.3. Egomotion Correction

Block 404 comprises performing egomotion correction on (input converted) ranges in the current instance of the "RangeImage" data structure, which is generated—through the input conversion operations of block 402—from the current source range data frame comprising the source ranges or samples acquired by the sensor.

Most range data sensors including but not limited to most LiDAR sensors scan over a field of view over a finite time period instead of taking a snap view at an instantaneous time point (with the exception of Flash LiDARs, which snap a picture or frame of the entire scene at a single instant in time).

When a structure such as a vehicle to which the sensor is mounted or disposed is in motion, a resulting scene obtained by the sensor appears distorted as different parts or portions of the scene are acquired or sampled by the sensor at different time points when the vehicle is in different spatial locations (e.g., different positions, different orientations, etc.). This can result in spatial distortions in objects/structures depicted in a source range data frame/image, such as vertical poles appearing slanted or bent, or objects on one side of the scene appearing squished while on the other side appear stretched out. These distortions may cause stationary objects/structures (e.g., stationary to the Earth, etc.) depicted in two (e.g., successive, timewise nearby, etc.) range data frames/images to be mismatched or misaligned.

The egomotion correction can be used to correct the spatial distortions and help properly align (e.g., spatially, etc.) two successive range data frames/images to each other such that stationary objects/structures depicted in the frames/images fit together.

The input converted ranges in the current instance of the "RangeImage" data structure can be (e.g., individually, respectively, etc.) egomotion corrected (or propagated) to a common end time point of the sensor's scanning process. The input converted ranges may be acquired by the sensor at respective individual acquisition time points before the common end time point. Respective time intervals may be derived or computed for the input converted ranges by taking time differences between the different acquisition time points and the common end time point, or may be derived directly from their respective latencies. Up to 6D spatial transformations may be applied to the input converted ranges to align the input converted ranges to the common end time point. The up to 6D spatial transformations to be applied to the input converted ranges may be generated from the respective time intervals of the input converted ranges times a pose rate ("PoseRate") representing up to 6D spatial displacements (e.g., up to 3D linear displacements, up to 3D angular displacements, etc.) per second as determined by the applicable egomotion estimated for the current instance of the "RangeImage" data structure. As a result of applying the egomotion correction, the egomotion corrected input converted ranges in the current instance of the "RangeImage" (or "RangeImageExtras") data structure appear to have been sampled at the same time point (or instant in time).

For the purpose of illustration only, let t0 be the end time point (which may be set as the current frame time point in some operational scenarios), as determined by a timestamp of the last cell in all the cells of the current instance of the "RangeImage" (or "RangeImageExtras") data structure for the current time point. If a given range (or a given point sample) in a cell precedes the end time point by a time interval of dT=t0−tS, then a point represented by the given range can be propagated by the pose rate ("PoseRate") multiplied by the time interval dT. This egomotion correction operation can be repeated for each cell in the cells of the current instance of the "RangeImage" (or "RangeImageExtras") data structure for the current time point.

In some operational scenarios, points represented in the current instance of the "RangeImage" data structure can be propagated through the egomotion correction as described herein. The propagated points can be kept in a corresponding current instance of the "RangeImageExtras" data structure for the current time point. The current instance of the "RangeImageExtras" data structure retains relatively precise spatial information (e.g., in floating points, etc.) including but not limited to azimuth and elevation values for the propagated points.

Additionally, optionally or alternatively, a propagated point can be mapped to a corresponding cell (or a correct cell that matches with the propagated spatial information of the point) in the "RangeImage" data structure. If up to two ranges per ray are to be kept in a cell, two ranges or samples that are not too similar (e.g., no more than 90% similar, etc.) may be kept in the cell. Collisions may occur when multiple similar points are propagated to the same cell or when more than two dissimilar points are mapped to the same cell after egomotion correction or propagation. Such a collision may be resolved by keeping the closest (e.g., two, etc.) of the colliding points in the same cell.

While the egomotion correction can undistort stationary parts of the scene, moving objects/structures in the scene may become further distorted from their real spatial shapes caused by a complex combination or interference of motions of the moving objects/structures and the egomotion of the sensor. In many operational scenarios using mapping techniques as described herein, it may not be necessary for moving objects/structures to match well between (e.g., successive, etc.) range data frames/images as represented with the data structures herein.

In some operational scenarios, when ranges or samples are transmitted (e.g., from device to device, from component to component, etc.), original timing information of the ranges or samples can also be provided along with the ranges or samples. This allows the applied egomotion correction to be later backed out if necessary to determine exactly where and when the ranges or samples were measured by the sensor.

3.4. Propagation of Accumulated Data

Block 406 comprises propagating accumulated prior ranges in an accumulated data buffer (e.g., 134 of FIG. 1, etc.).

The accumulated prior ranges may refer to prior ranges accumulated, generated and/or updated at least in part with decompression operations that decompress prior compressed range data up to a prior time point. The accumulated prior ranges may be stored or buffered as a part of accumulated prior range data in the accumulated data buffer as a prior instance of the "AccumulatedRangeImage" data structure for the prior time point. The "AccumulatedRangeImage" data structure may inherit or instantiate from and/or contain some or all of the same data fields/elements in the "RangeImage" or "RangeImageExtras" data structure.

In some operational scenarios, at a start time of a range data processing session before current and prior range data starts flowing from the sensor, the "AccumulatedRangeImage" data structure may be empty with each and every sample/cell in the data structure marked as invalid and/or in need of refreshing.

Once the accumulated prior range data including but not limited to the accumulated prior ranges is loaded into the "AccumulatedRangeImage" data structure, the accumulated prior range data in the data structure represents an internal estimate (as opposed to current range data being currently acquired by the sensor) of the scene. Conceptually, the current range data acquired by the sensor can be compared with this internal estimate to determine which ranges or samples in the current range data need to be transmitted from the range data transmitter to a downstream range data receiver. In other words, when the current range data frame containing the current (e.g., newly acquired, most recent, etc.) range data—as input converted and egomotion corrected—for the current (frame) time point arrives, the "AccumulatedRangeImage" data structure contains the accumulated prior range data that depicts the scene as was in the prior time point, for example immediately before the current time point.

To compare the accumulated prior range data in the "AccumulatedRangeImage" data structure with the current range data in the current instance of the "RangeImage" data structure, the accumulated prior range data can be propagated by egomotion (e.g., pose rate multiplied by a time interval between the prior time point and the current time point, etc.) to the current (frame) time point. Propagation operations are similar to egomotion correction except that the same time interval may be used to propagate the accumulated prior ranges from the prior time point to the current time point. The same or similar transformation (e.g., the same or similar linear displacements, the same or similar angular displacements, etc.) can be applied to some or all accumulated prior ranges or samples to move them from the prior time point to the current time point.

3.5. Gap/Hole Filling

As noted, current ranges (each representing a point or a point sample in a 3D space) may be obtained for the current time point through applying egomotion correction to source ranges acquired by a sensor (e.g., a LiDAR sensor, a non-LiDAR sensor, etc.). The current source ranges (or current or newly acquired range sensory data) may be obtained by the sensor in a raster scanning process that scans a 3D space with multiple horizontal scanlines in succession along a vertical direction. Thus, as noted, the source ranges are obtained at different time points even along the same scanline as well as among different scanlines. In some operational scenarios, the egomotion correction is applied to the source ranges to adjust them to the end time point at which the last source range is acquired by the sensor. For example, each source range acquired at an earlier time point preceding the last time point may be adjusted by a spatial displacement (e.g., a linear displacement, an angular displacement, etc.) computed with an applicable rate of change in poses (e.g., linear position, angular position, etc.) of the sensor such as "PoseRate" (e.g., a linear velocity, an angular velocity, etc.) times an individual time difference between the earlier time point and the last time point. The last time point may be deemed as the current (frame) time point for the current range data frame (e.g., the current instance of the "RangeImage" data structure, etc.) used to store the current (egomotion corrected, input converted ranges) obtained by applying the egomotion correction to the source ranges.

Propagated accumulated prior ranges (each representing a propagation of a prior range or a prior point sample in the 3D space) may be obtained for the current time point through applying propagation to the accumulated prior ranges in the accumulated prior range buffer (134). As noted, the accumulated prior ranges refer to prior ranges accumulated, propagated and/or egomotion corrected up to the prior (frame) time point, for example immediately preceding the current time point.

In some operational scenarios, the propagation is applied to the accumulated prior ranges to adjust them to the same current time point to which the current ranges in the current range data frame are also adjusted through the egomotion correction. For example, each prior range accumulated, propagated and/or egomotion corrected up to the prior time point may be propagated or adjusted by a spatial displacement (e.g., a linear displacement, an angular displacement, etc.) computed as "PoseRate" times the time difference between the prior time point and the current time point. The propagated accumulated prior ranges may be stored in a current propagated range data frame represented by a current instance of a propagated range data structure (e.g., "RangeImage", "RangeImageExtras", etc.).

Gap/hole filling may be performed on the current ranges obtained through input conversion and egomotion correction or propagated accumulated prior ranges obtained through propagation of the accumulated prior ranges in the accumulated prior range buffer (134). The current ranges or the propagated accumulated prior ranges may be stored in cells of a respective range data structure such as "RangeImage", "RangeImageExtras", or the current instance thereof.

In some operational scenarios, for cells that still have one, two or more ranges representing one, two or more point samples after egomotion estimation or propagation, no gap or hole filling operations are performed, and the point samples—e.g., pruned or limited to no more than a certain number such as two—may be left alone in these cells.

In some operational scenarios, after the egomotion correction or propagation, some cells in the range data structure such as an instance of the "RangeImageExtras" data structure may be empty.

For example, rays may be emitted by the sensor to probe a 3D space in which objects/structures in the distance may move toward the sensor over time. At an initial time when the objects/structures appears small, only a few rays may be hitting the objects/structures to cause echoes or returns from the objects/structures to be received and measured in initial scanlines by the sensor in a current source range data frame. However, at a later time when the objects/structures appears large, more rays may be hitting the objects/structures to cause echoes or returns from the objects/structures to be received and measured in later scanlines by the sensor in the current source range data frame. Thus, the objects/structures in the current source range data frame without egomotion correction can appear warped with portions of the objects/structures scanned earlier to look small in size and with portions of the objects/structures scanned later to look large in size. In addition, when source ranges in the initial scanlines are egomotion corrected to the last time point of the raster scanning process, only the very few measurements made when the objects/structures were small are available to generate egomotion corrected ranges for the previously small portions of the objects/structures, which now look larger. As a result, the points or ranges for these portions may be distributed further apart from each other than the initial time, thereby giving rise to gaps/holes in the egomotion corrected ranges.

Likewise, from frame to frame, the objects/structures can change in size. Propagation of prior ranges with relatively few points for these objects/structures in a previous frame may cause these propagated prior ranges to be more sparsely distributed in a later frame, thereby giving rise to or opening up gaps/holes in the propagated prior ranges.

As used herein, gaps or holes refer to (e.g., contiguous, groups of contiguous, etc.) cells with no range data values in the 2D array represented in the range data structure after egomotion correction or propagation.

In some operational scenarios, for smooth surfaces (e.g., represented with range data values forming smooth curves, lines, or contours, etc.) of objects/structures, range data values for gaps or holes can be generated through interpolation from neighboring (e.g., external boundaries of the gaps or holes, etc.) range data values outside the gaps or holes. These interpolated values are likely to match well with future range measurements related to these smooth surfaces of the objects/structures.

To perform gap/hole filling interpolation (or extrapolation), a list of interpolation (or extrapolation) candidates can be made from multiple (e.g., 4, vertical, horizontal, left down diagonal, right up diagonal, etc.) pairs of points in each pair of opposing neighbor cells, for example located on the external boundary of the gap or hole containing the cell for which an interpolated value is to be generated. Some or all combinations of pairs of points (or ranges) from each pair of opposing neighbor cells may be used to generate candidate interpolated values. In some embodiments, similarities in ranges in some or all of the neighboring cells may be determined. If any neighboring cell has outlier ranges or ranges too different (e.g., as determined by a minimum similarity threshold, etc.) from ranges in (e.g., a plurality, a majority, etc.) other neighboring cells, the neighboring cell may be removed from being used as interpolation/extrapolation candidates.

The available neighboring cells and some or all the ranges therein may be used to generate distinct combinations of pairs of ranges from different pairs of opposing neighboring cells. Each combination in some or all the distinct combinations of pairs of ranges may be used to generate interpolated ranges as candidate ranges for the cell.

The best interpolation or the best interpolated range may be selected from some or all candidate ranges based on a similarity measure. For example, similarity measures may be computed among the candidate ranges and used to select or derive the best candidate to be stored in the cell. The candidate ranges obtained as interpolated/extrapolated values may have a single group or cluster of similar interpolated/extrapolated ranges (or the largest group or cluster among multiple groups or clusters) as indicated by the interpolated/extrapolated ranges or similarities computed from these interpolated/extrapolated ranges. the best range may be derived as the best interpolated or extrapolated range or a centroid in the group or cluster of interpolated/extrapolated ranges having the highest (or most) similarities—for example each above a 90% similarity. The next best candidate may be derived similarly from remaining interpolated/extrapolated ranges on a basis of having the next highest (or most) similarity to the remaining interpolated/extrapolated ranges, possibly subject to a constraint such as having less than 90% similarity to the best candidate so that the two best candidates (or ranges) as selected to be stored in the cell are not be too close to each other.

In some operational scenarios, compression and decompression operations implemented with a range data transmitting device and a range data receiving device may include interpolation (or extrapolation) operations that can be identically performed by the two devices. In these operational scenarios, interpolation (or extrapolation) operations to fill gaps or holes may be performed by both of the two devices. For example, the range data transmitting device may perform the interpolation operations to fill the gaps or holes. Also, the range data transmitting device may operate—with the same interpolation operations as performed by the range data transmitter—to fill the gaps or holes, for example for exposed spatial features of the objects/structures (e.g., non-smooth surfaces, etc.) and provide the result to the range data receiving device in a range data signal comprising compressed range data. Hence, the range data transmitter performs the same interpolations as the range data receiver for the purpose of determining whether a new sample is to be transmitted. The interpolated samples may not be transmitted. The range values transmitted (or determined/identified to be transmitted from the range data transmitter to the range data receiver) for a cell can be freshly determined values for the cell (subject to resampling to the grid). The accumulated data buffers maintained respectively on the receiver (RX) and transmitter (TX) side can be identical (in reference to the same range data frame), so that the transmitter has context for or knows how the receiver will interpret the transmitted range data. In some operational scenarios, some packet loss can be tolerated, which may result in false reconstruction of some samples for a while until they are cleared by fresh data. The accumulated data, after being propagated to the current time, may have hole filling/interpolation applied to it (or the accumulated data), on both the transmitter and receiver sides. The transmitter and receiver both use the same logic to fill gaps/holes or interpolate ranges, and thus still resulting the buffers being identical on both the transmitter and receiver sides.

3.6. Range Data Resampling

Range data resampling can be performed to align ranges in different range data frames for the purpose of facilitating comparing and subsequent compressing range data values in at least one of the different range data frames. For example, after the range data resampling herein is performed on two range data frames such as the current range data frame and the propagated prior range data frame, a cell at a position or index in the 2D array of cells in the current range data frame has the same azimuth and elevation angles as a corresponding cell at the same position or index in a corresponding 2D array of cells in the propagated prior range data frame.

Block 408 comprises performing range data resampling on egomotion corrected range data in the current range data frame for the current time point. Block 410 comprises performing range data resampling on the propagated accumulated prior range data in the current propagated accumulated prior range data frame for the same current time point. The current propagated accumulated prior range data frame may be propagated from a prior propagated accumulated prior range data frame for the prior time point preceding the current time point, and represented as an instance of the "AccumulatedRangeImageExtras" data structure (with similar information as captured in the "RangeImageExtras" data structure) or an instance of the "AccumulatedRangeImage" data structure (with similar information as captured in the "RangeImage" data structure).

For the purpose of illustration only, a relatively precise version (e.g., a version more precise than an integer quantization version, etc.) of egomotion corrected current ranges or propagated accumulated prior ranges for a given time point (e.g., corresponding to a frame index, etc.) such as the current time point may be stored or represented in (an instance of) the "RangeImageExtras" data structure. The egomotion corrected current ranges or propagated accumulated prior ranges in the data structure retain precise information about where a represented point was propagated to. As a result, the egomotion corrected or propagated ranges in the data structure before the resampling herein may correspond to different azimuth and/or elevation angles than respective cells—in which the egomotion corrected or propagated ranges are stored—imply or indicate through cell positions/indexes.

For the purpose of comparing ranges or samples between or among different range data frames (e.g., of the same type, "RangeImageExtras", etc.), it is relatively efficient and accurate to work with samples which have matching azimuth and elevation angles, but possibly differ in range values (e.g., distances, etc.).

Additionally, optionally or alternatively, ranges as described herein may need to be further quantized, compressed and transmitted from device to device (or from one part of a system to another part of the system). Azimuth and elevation angles may be (e.g., simply, efficiently, etc.) indicated or implied with cell indexes or positions to reduce bandwidth usage, rather than incur additional bandwidth or use additional data field values to explicit specify or signal azimuth and elevation angular values in operations related to quantization, compression or transmission.

To make this possible, the (e.g., egomotion corrected, propagated, etc.) ranges in the "RangeImageExtras" data structure can be resampled (e.g., back, etc.) into a cell pattern or a 2D array of cells represented in the corresponding (instance of) "RangeImage" data structure. Cell positions or indices of cells in the "RangeImageExtras" data structures storing the resampled range data values can be used to indicate, imply or infer (e.g., ideal, center, etc.) azimuth and elevation angles for the cells.

A one-to-one correspondence of samples (or ranges) may be maintained between pre-resampled samples of the "RangeImageExtras" data structure and post-resampled samples of the "RangeImageExtras" data structure with cell positions/indexes aligned with those of the corresponding "RangeImage" data structure in terms of azimuth and elevation angles indicated or implied by the cell positions/indexes. In other words, a post-resampled sample in a cell of the "RangeImageExtras" data structure may be generated for each pre-resampled sample in the cell. The post-resampled sample represents a selected (e.g., best, etc.) interpolation selected at or adjusted/interpolated to the correct azimuth and elevation angles of the cell as indicated or implied in the corresponding "RangeImage" data structure. In case only a single sample or point is available for interpolation, the single sample or point may be used for the cell, as interpolation may need at least two samples or points to connect into a line or a spatial construct for the purpose of carrying out the interpolation. Storing the single available sample or point without interpolation may possibly lead to angular error as the single sample or point may or may not be of the same azimuth and elevation angles as those indicated or implied by the cell position or index of the cell in the post-resampled range data structure.

For each pre-resampled sample in a cell, a test can be made of some or all possible vertical interpolations to select or determine a best interpolation among the vertical interpolations. Some or all (e.g., pre-resampled, etc.) samples in (e.g., nearest, nearest available, etc.) cells above and below the cell of the pre-resampled sample can be used to generate these vertical interpolations with connecting lines from the samples in the cells above or below the cell to the pre-resampled sample in the cell. The connecting lines (or other spatial constructs for interpolation) may be used in carry out interpolation/extrapolation to generate interpolated values (or candidate post-resampled samples in the vertical direction) for an elevation angle the same as what is indicated or implied by the cell's position or index. Each of these interpolated values (or candidate post-resampled samples) can be produced with the same elevation as that indicated or implied by the position or index of the (destination) cell, but possibly with different azimuth angles.

In some operational scenarios, any candidate post-resampled sample in the vertical direction with an azimuth angle too different (e.g., outside a specific configured or dynamically determined tolerance range, etc.) from that indicated or implied by the position or index of the cell may be ignored, excluded and/or removed as a candidate post-resampled sample for upcoming operations. Among all the (e.g., remaining, etc.) candidate post-resampled samples obtained through interpolation/extrapolation, the best candidate post-resampled samples may be selected as one with a range that has the highest similarity (e.g., as determined by a similarity measure, etc.) to the range of the pre-resampled sample for which the candidate post-resampled samples are obtained.

Likewise, for the pre-resampled sample in the cell, candidate post-resampled samples in the horizontal direction (spanning azimuth angles) may be similarly generated from some or all (e.g., pre-resampled, etc.) samples in (e.g., nearest, nearest available, etc.) cells on both sides of the cell in the horizontal direction. These candidate post-resampled samples have the same azimuth angle matching that indicated or implied by the position or index of the cell, but may or may not have the same elevation angles as indicated or implied by the position or index of the cell. Among all the (e.g., remaining after excluding out-of-bound, etc.) candidate post-resampled samples obtained through interpolation/extrapolation along the horizontal direction, the best candidate post-resampled samples may be selected as one with a range that has the highest similarity (e.g., as determined by a similarity measure, etc.) to the range of the pre-resampled sample for which the candidate post-resampled samples are obtained.

In the next step, interpolations/extrapolations can be made between the best candidate horizontally interpolated sample (or point) and its similarly aligned neighbors in the vertical direction (or other candidate horizontally interpolated samples). Some or all combinations of the best candidate horizontally interpolated sample and its aligned neighbors may be considered and evaluated to select one or more (e.g., up to two samples in each cell, etc.) new candidate post-resampled samples (or points) with both azimuth and elevation angles matching those indicated or implied by the position or index of the cell.

Likewise, interpolations/extrapolations can be similarly made between the best candidate vertically interpolated sample (or point) and its similarly aligned neighbors in the horizontal direction (or other candidate vertically interpolated samples). Some or all combinations of the best candidate vertically interpolated sample and its aligned neighbors may be considered and evaluated to select one or more (e.g., up to two samples in each cell, etc.) new candidate post-resampled samples (or points) with both azimuth and elevation angles matching those indicated or implied by the position or index of the cell.

The best (e.g., up to two, etc.) of these horizontally and vertically interpolation samples (or points) may be identified, for example, based on their respective similarity of their ranges to the pre-resample range in the pre-resampled sample of the cell.

3.7. Range Data Comparison and Compression

Block 412 comprises comparing the resampled egomotion corrected current range data in the current range data frame with resampled propagated accumulated prior range data. Block 414 comprises performing range data compression on result of the comparison operation in block 412. The range data transmitter compares the current range data frame—comprising egomotion corrected range data in the current instance of the "RangeImage" data structure for the current time point—with the propagated accumulated data generated from propagating accumulated data from the prior time point to the current time point. The accumulated data comprises range data accumulated up to a prior range data frame for the prior time point, for example immediately preceding the current time point.

In some operational scenarios, a range data receiver as described herein can implement the same or similar operations as implemented in the range data transmitter to accumulate the same or similar accumulated data or range data accumulated up to the prior range data frame for the prior time point, subject to possible coding/quantization errors.

Through comparing the current range data frame and the propagated accumulated data, the range data transmitter determines or distinguishes which ranges or samples can be simply represented or derived by a propagation or egomotion transformation of the accumulated prior range data available for the prior time point and which other samples cannot be so simply represented or derived but rather need to be updated in a range data signal (e.g., 122 of FIG. 1 or FIG. 2, etc.) from the range data transmitter to the range data receiver.

For the ranges or samples that can be simply represented or derived by the propagation (or egomotion transformation) of the accumulate prior range data, the range data transmitter can omit providing these ranges or samples in the range data signal (122) and thus omit further processing such as quantization and transmission of these ranges or samples to the range data receiver. Instead, the ranges or samples can be obtained by the range data receiver itself from propagating the accumulated prior range data available in the range data receiver, subject to possible coding/quantization errors.

A minimum range similarity threshold (e.g., 98-99%+ similarity with 1-2% error rate, 97%+ similarity with up to 3% error rate, 95%+ similarity with up to 5% error rate, etc.) can be used by the range data transmitter in comparing the current range data frame and the propagated accumulated data to identify or distinguish ranges or samples that can be generated or propagated from the accumulated prior range data from other ranges or samples that cannot be so generated or propagated.

The minimum range similarity threshold or maximum error threshold may be preconfigured by a system and/or by a designated user. Additionally, optionally or alternatively, in various operational scenarios, the minimum range similarity threshold or maximum error threshold may be configured programmatically, adaptively, dynamically, statically, based at least in part on events, based at least in part on user input, and so forth. The higher the minimum range similarity threshold is, the lower the maximum error threshold is, the lower the error rate will be, and correspondingly the lower compression efficiency will be achieved. A tradeoff may be made by a system and/or a user between accuracy and compression efficiency in setting the minimum range similarity.

The other ranges or samples that cannot be generated from a propagation or emotion transformation of the accumulated prior range data may be identified, collected, compressed and/or transmitted from the range data transmitter to the range data receiver.

In some operational scenarios, with the minimum range similarity threshold set to 97-98%+ or maximum error threshold set to 1%-2%, only 8-10% of the original size of the range data in the current range data frame may be sent by the range data transmitter to the range data receiver.

In some operational scenarios, in the current compressed range data frame, an array of (e.g., 3 bit, etc.) indicators may be transmitted in (an corresponding instance of) an output "CompressedData" data structure from the range data transmitter to the range data receiver.

Each (e.g., 3 bit, etc.) indicator in the array of indicators in the current compressed range data frame corresponds to a respective cell in the 2D array of cells in the current range data frame. For example, for each cell in the "RangeImage" data structure (or the instance thereof for the current time point), up to two ranges may be stored. An indicator—in the array of indicators—can be determined or assigned to each such cell. The indicator describes which prior range(s) of the up to two prior ranges in the accumulated data should be retained and used to generate current range(s) in the cell of the current instance of the "RangeImage" data structure through propagation or (frame-level) egomotion correction. Additionally, optionally or alternatively, the indicator describes whether new range(s) are provided in transmitted data from the range data transmitter to the range data receiver.

An indicator—in the array of indicators—may be defined for a cell to cover a range of (e.g., all, etc.) possible cases, each of which corresponds to a unique 3-bit value or a unique Enum value, as follows: CLEAR_NONE, CLEAR_FIRST, CLEAR_SECOND, CLEAR_BOTH, CHANGE_AND_CLEAR, CHANGE_FIRST, CHANGE_SECOND, CHANGE_BOTH.

Here, CLEAR_NONE may mean making no changes in the cell. CLEAR_FIRST means clearing the first return (or the first range) in the cell. CLEAR_SECOND means clearing the second return (or the second range) in the cell. CLEAR_BOTH means clearing both returns (or both ranges) in the cell. CHANGE_AND_CLEAR means changing the first return (or the first range) and clearing the second return (or the second range) in the cell. CHANGE_FIRST means changing the first return (or the first range) in the cell. CHANGE_SECOND means changing the second return (or the second range) in the cell. CHANGE_BOTH means changing both returns (or both ranges) in the cell.

In some operational scenarios, changing either of the two returns (or two ranges) in a cell may result in changed returns (or changed ranges) in the cell being reordered, as the closer return (or the closer range) in the cell may be presented first with the further return or non-return presented last.

The output "CompressedData" data structure or the instance thereof is of a variable size.

In some operational scenarios, the first part of the output "CompressedData" data structure may be the same as the header of the "RangeImage" data structure (or the current range data frame) that the output "CompressedData" data structure at least partly (or equivalently) represents.

The second part of the output "CompressedData" data structure is a packed, fixed size array of (cell change) indicators (of 3 bits each) as previously mentioned.

The third part of the output "CompressedData" data structure is a variable length list of sample values (e.g., returns or ranges, etc.). The sample values (e.g., returns or ranges, etc.) in the variable length list for the (non-skipped) cells are presented in the same order as cell change indicators for these (non-skipped) cells. Cells that do not need to be transmitted (or can be generated with propagation or egomotion correction of the accumulated data) are skipped by the variable length list.

For each cell in the current range data frame, the range data transmitter determines which ranges in the cell can be generated with propagated (or egomotion corrected) accumulated data. The indicator for the cell comprises bit values to indicate whether and which prior range data (e.g., samples, returns, ranges, etc.) is retained, and whether and which new (or current non-propagated) data (e.g., samples, returns, ranges, etc.) is transmitted.

New (or current non-propagated) data such as new samples, returns or ranges that are not well represented in propagated accumulated (prior) data is appended onto the variable length output list in a deterministic order such that the respective destination cell can be ascertained or determined by the range data receiver from the array (or sequence) of indicators (or flags) for the current data frame in the second part of the output "CompressedData" data structure.

In some operational scenarios, range data in the resulting variable length "CompressedData" data structure can be (e.g., directly, after quantization or coding, after further data compression operations, without modification/addition, etc.) transmitted or stored. The range data in the "CompressedData" data structure fully describes information or data needed by the range data receiver to reconstruct (the same or similar version of) the current range data frame in combination with previously received "CompressedData" data structures or data packets including these previously received "CompressedData" data structures.

In the case of the very first range data frame, there is no accumulated prior data, so all range data such as samples, returns or ranges in the first range data frame can be transmitted by the range data transmitter to the range data receiver. Additionally, optionally or alternatively, in some operational scenarios, all range data such as samples, returns or ranges in a range data frame (not necessarily the very first frame) can be transmitted by the range data transmitter to the range data receiver from time to time, intermittently, at a subset of selected time points among all the time points, and so forth.

3.8. Compressed Range Data Accumulation

As noted, an accumulation buffer (e.g., 134 of FIG. 1, 134' of FIG. 2, etc.) may be used to buffer or cache range data decompressed (or decoded) from the "CompressedData" data structure for the next time point by the range data transmitter and/or the range data receiver. Each point of a point cloud spatially distributed in a 3D space such as samples, returns or ranges for the point may be added as a range data portion into the range data kept or maintained in the accumulation buffer. The point or its corresponding range data portion may be propagated from frame to frame by successive egomotion updates/corrections or propagations, until the point or its corresponding range data portion is either overwritten or cleared.

This same propagation and accumulation process and resultant range data can be kept or maintained in the accumulation buffer for both compression and decompression sides of a data communication link, for example by the range data transmitter and receiver respectively.

For the compression side or the range data transmitter, the range data in the accumulation buffer is used for comparing the current range data frame with the propagated accumulated data to determine in which cells range data should be transmitted from the range data transmitter to the range data receiver.

For the decompression side or the range data receiver, the range data in the accumulation buffer is used by the range data receiver to add or combine with the new range data received with the "CompressedData" data structure in a range data signal from the range data transmitter to generate or reconstruct (full) range data in the current range data frame used by the range data transmitter to generate the "CompressedData" data structure received by the range data receiver.

In some operational scenarios, the result of propagating the accumulated prior data in the accumulation buffer can be kept in a "RangeImageExtras" data structure (e.g., instead of a "RangeImage" data structure, etc.) to retain relatively precise positions and/or ranges of points in the point cloud, so that quantization such as angular quantization does not (e.g., significantly, etc.) corrupt or impact the propagation accumulated data.

In some operational scenarios, new samples such as those converted or egomotion corrected from source range data acquired by the sensor can also be accumulated into a "RangeImageExtra" data structure to store or cache a relatively precise version of current range data—which may be assigned or designated indicated or implied (e.g., ideal, etc.) azimuth and elevation for each cell.

For each cell in the accumulation buffer (e.g., "RangeImageExtras", etc.), range data values stored or to be stored in the cell can be updated in accordance with a corresponding indicator (or flag) for the cell as included in the "CompressedData" data structure. If the indicator indicates that new data should be used for the cell, a corresponding sample (e.g., return, range, etc.) for the cell as specified in the "CompressedData" data structure is loaded into the cell.

In some operational scenarios, multiple samples (e.g., up to two samples, etc.) in a cell can be adjusted (e.g., ordered, reordered, etc.) so that the first sample is closer than the second sample and that the second sample is not set while a data field in the cell for the first sample is empty or unoccupied.

Range data as described herein may be transmitted and received over a wide variety of data communication links including but not limited to reliable data communication links (e.g., TCP communication links, etc.), unreliable data communication links, over wired connections, over wireless connection, over optical communication links, etc.

In some operational scenarios, package dropping may cause reconstructed range data by a recipient device or component to be less precise. Errors may be corrected over time as transmission of newly acquired range data for a cell can occur when propagated accumulated data for the cell become more diverse from and less similar to newly acquired range data for the cell.

Additionally, optionally or alternately, a full-frame refresh comprising new range data for some or all cells in a current range data frame can be sent repeatedly, such as every few seconds, to limit the duration (or timeframe) of any mismatch at the expense of additional bandwidth usage.

3.9. Decompressing and Reconstructing Range Data

Figure 4B:
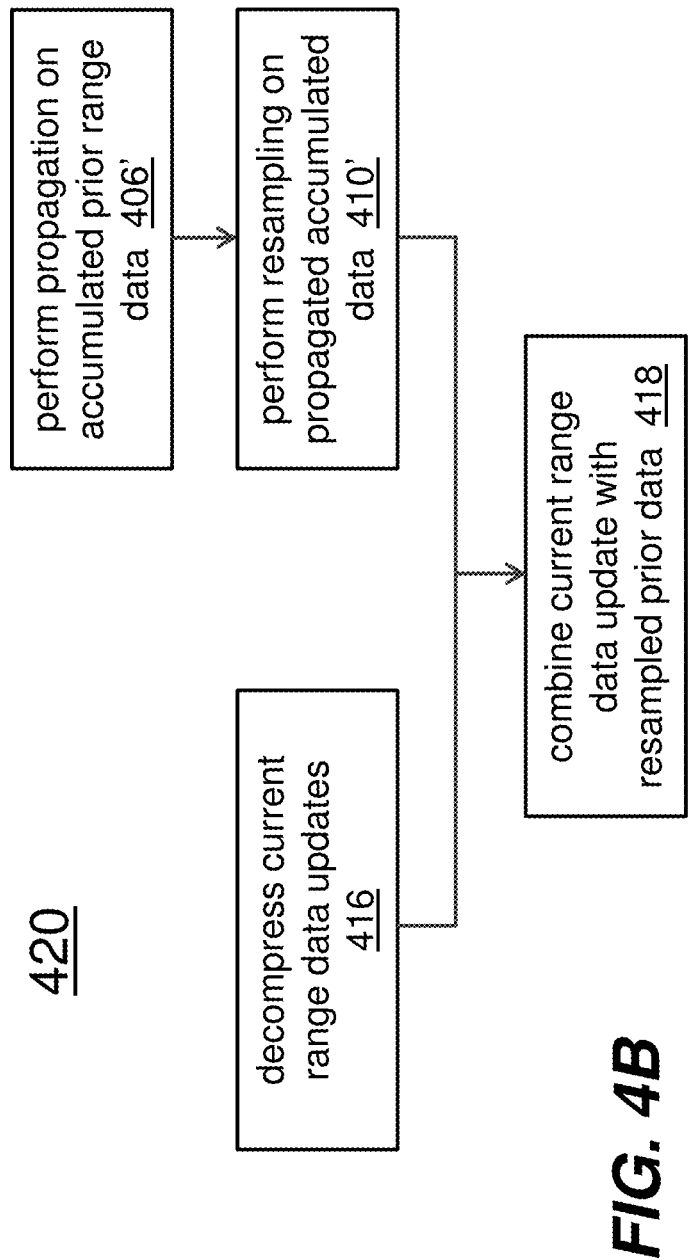

FIG. 4B illustrates an example processing flow 420 for range data decompression and reconstruction, according to an embodiment. The various elements of flow 420 may be performed in a variety of systems (e.g., one or more classical computing devices, etc.), including systems such as the system (200) described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer. The flow (420) illustrates but one example flow for range data decompression and reconstruction. Other flows may involve additional or fewer steps, in potentially varying arrangements.

The flow (420) may be used to derive or assemble a reconstruction version of a single current range data frame for a current time point from a combination of current range data updates, accumulated prior range data and applicable egomotion applicable to the current time point.

The flow (420) can be continuously and repeatedly executed to derive a series of reconstructed range data frames for a series of consecutive (frame) time points.

In some operational scenarios, the processing flow (420) is enabled with the above mentioned combination as input with no or little additional input data, aside from input operational parameters to the process flow (420) for controlling quality of compressed data generated from the processing flow (420).

Block 416 comprises receiving (e.g., continuously, in real time, in near real time, etc.) range data updates in the range data signal (122) and demultiplexing/decoding the range data signal (122) into a series of compressed range data frames for the series of (frame) time points and a corresponding series of egomotion values for the series of (frame) time points.

Similar to blocks 406 of the flow (400), block 406' comprises propagating accumulated prior range data in an accumulated prior range buffer 134' up to a prior time point immediately preceding the current (frame) time point, using applicable egomotion in the series of egomotion values for the series of (frame) time points received in the range data signal (122).

Also similar to block 410 of the flow (400), block 410' comprises resampling the propagated accumulated prior range data.

Block 418 comprises combining current range data updates received in the series of consecutive compressed range data structures with the resampled propagated accumulated prior range data to generate or assemble a reconstructed version of the current range data frame.

4.0. Example Process Flows

FIG. 4C illustrates an example process flow 440 according to an embodiment. In some embodiments, one or more computing devices or components may perform this process flow. In block 442, a system as described herein generates a current range data frame for a current time point. The current range data frame includes a two-dimensional (2D) array of current range data cells. Each current range data cell in the 2D array of cells of the current range data frame includes zero or more current ranges. The zero or more current ranges in the current range data cell represent zero or more points in a point cloud in a three-dimensional (3D) space for the current time point.

In block 444, the system propagates accumulated prior ranges in an accumulated prior range buffer from a prior time point to the current time point. The accumulated prior ranges have been accumulated from past range data up to the prior time point. The propagated accumulated prior ranges constitute a set of propagated accumulated prior ranges in a 2D array of accumulated prior range data cells.

In block 446, the system compares a set of current ranges in the 2D array of current range data cells with the set of propagated accumulated prior ranges in the 2D array of propagated accumulated prior ranges to determine a set of range differences between the set of current ranges and the set of propagated accumulated prior ranges.

In block 448, the system identifies, based at least in part on the set of range differences, a proper subset of current ranges in the set of current ranges.

In block 450, the system includes the proper subset of current ranges in a range data signal to be transmitted from a range data transmitter to a range data receiver. The range data signal excludes other current ranges in the set of current ranges other than the proper subset of current ranges.

In an embodiment, the zero or more points, represented by the zero or more current ranges in the current range data cell, have a specific azimuth angle and a specific elevation angle as indicated by a cell index of the current range data cell.

In an embodiment, the zero or more current ranges in the current range data cell are generated at least in part from zero or more source ranges acquired by a range data sensor through egomotion correction; the egomotion correction is specified by a multidimensional rate of change in poses of the sensor times a time difference; the time difference relates to a data acquisition time point at which the zero or more source ranges are acquired by the range data sensor.

In an embodiment, the propagated accumulated prior ranges are generated at least in part from the accumulated prior ranges through spatial transformations; the spatial transformation are specified by a multidimensional rate of change in poses of the sensor times a time difference; the time difference is a difference between the prior time point and the current time point.

In an embodiment, the set of current ranges includes at least one current range obtained from interpolating pre-resampled current ranges to a specific angle indicated by a cell index of a current range data cell in the 2D array of current range data cells; the set of propagated accumulated prior ranges includes at least one propagated accumulated prior range obtained from interpolating pre-resampled propagated accumulated prior ranges to a specific angle indicated by a cell index of a current range data cell in the 2D array of current range data cells.

In an embodiment, the proper subset of current ranges are represented in a compressed data construct; the compressed data construct includes a series of indicators each of which corresponds to a respective current range in the other current ranges excluded from the range data signal; the series of indicators instructs the range data receiver to generate a reconstructed version of the other current ranges from propagating receiver-maintained accumulated prior ranges up to the prior time point.

In an embodiment, the proper subset of current ranges are identified in the set of current ranges further based on one of: a maximum range error threshold, a minimum range similarity threshold, or another range comparison threshold.

FIG. 4C illustrates an example process flow 460 according to an embodiment. In some embodiments, one or more computing devices or components may perform this process flow. In block 462, a system as described herein decodes, for reconstructing a current range data frame, a proper subset of current ranges from a range data signal transmitted from a range data transmitter to a range data receiver. The current range data frame includes a set of current ranges to which the proper subset of current ranges belongs. The range data signal excludes other current ranges in the set of current ranges other than the proper subset of current ranges.

In block 464, the system propagates accumulated prior ranges in an accumulated prior range buffer from a prior time point to the current time point. The accumulated prior ranges have been accumulated from past range data up to the prior time point. The propagated accumulated prior ranges constitute a set of propagated accumulated prior ranges in a two-dimensional (2D) array of accumulated prior range data cells.

In block 466, the system combines the proper subset of current ranges and the set of propagated accumulated prior ranges into a reconstructed version of the current range data frame.

In block 468, the system maps a three-dimensional (3D) space with a point cloud. The point cloud is constituted with a set of points represented at least in part by a set of ranges in a 2D array of the reconstructed version of the current range data frame.

In an embodiment, a computing device is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Other examples of these and other embodiments are found throughout this disclosure. Note that, although separate embodiments are discussed herein, any combination of embodiments and/or partial embodiments discussed herein may be combined to form further embodiments.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 5:
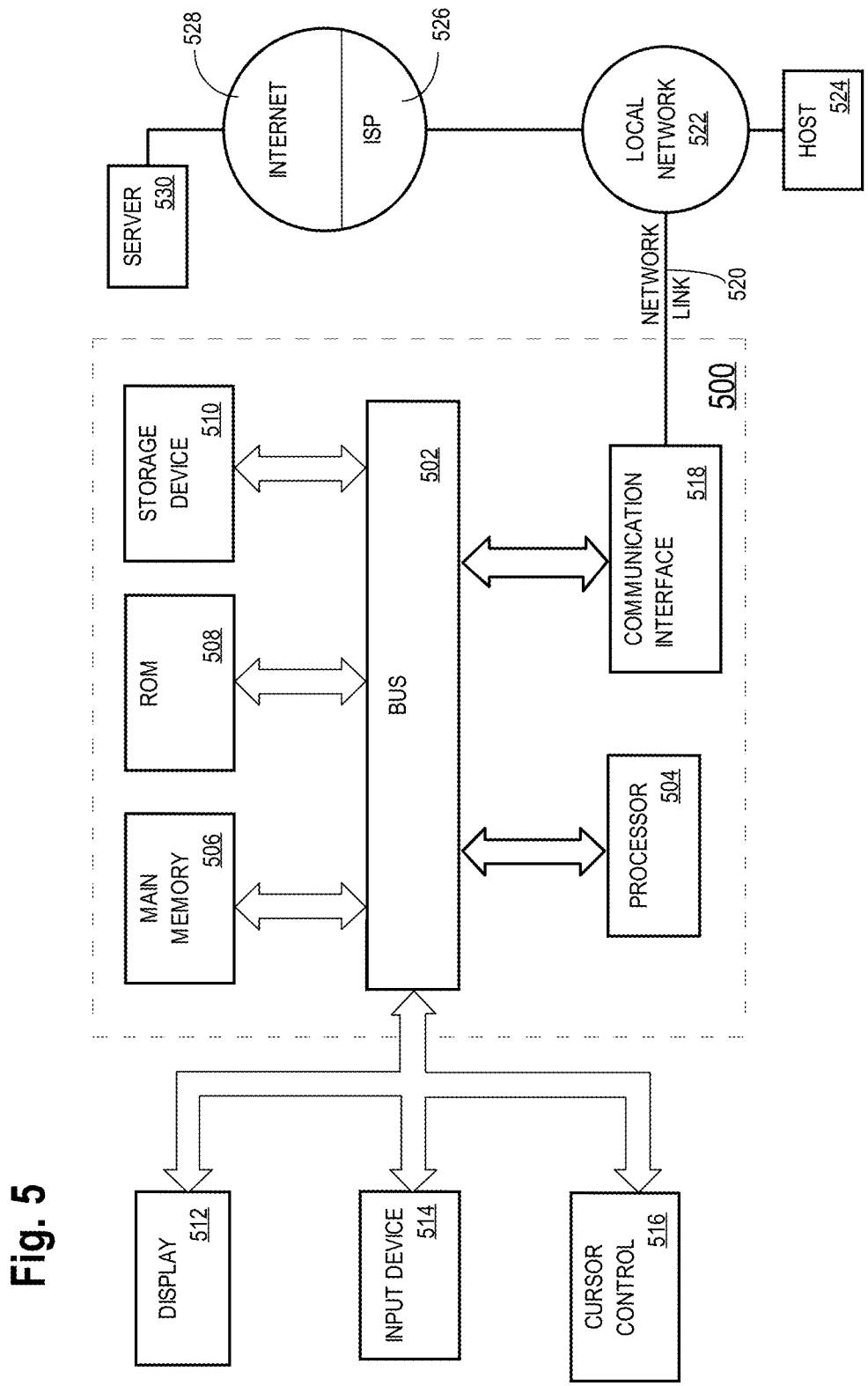
FIG. 5 is block diagram of a computer system upon which embodiments of the invention may be implemented.

FIG. 5 is a block diagram that illustrates a computer system 500 utilized in implementing the above-described techniques, according to an embodiment. Computer system 500 may be, for example, a desktop computing device, laptop computing device, tablet, smartphone, server appliance, computing main image, multimedia device, handheld device, networking apparatus, or any other suitable device.

Computer system 500 includes one or more busses 502 or other communication mechanism for communicating information, and one or more hardware processors 504 coupled with busses 502 for processing information. Hardware processors 504 may be, for example, a general purpose microprocessor. Busses 502 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 500 also includes a main memory 506, such as a random access memory (RAM) or other dynamic or volatile storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes one or more read only memories (ROM) 508 or other static storage devices coupled to bus 502 for storing static information and instructions for processor 504. One or more storage devices 510, such as a solid-state drive (SSD), magnetic disk, optical disk, or other suitable non-volatile storage device, is provided and coupled to bus 502 for storing information and instructions.

Computer system 500 may be coupled via bus 502 to one or more displays 512 for presenting information to a computer user. For instance, computer system 500 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 512 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 512.

In an embodiment, output to display 512 may be accelerated by one or more graphics processing unit (GPUs) in computer system 500. A GPU may be, for example, a highly parallelized, multi-core floating point processing unit highly optimized to perform computing operations related to the display of graphics data, 3D data, and/or multimedia. In addition to computing image and/or video data directly for output to display 512, a GPU may also be used to render imagery or other video data off-screen, and read that data back into a program for off-screen image processing with very high performance. Various other computing tasks may be off-loaded from the processor 504 to the GPU.

One or more input devices 514 are coupled to bus 502 for communicating information and command selections to processor 504. One example of an input device 514 is a keyboard, including alphanumeric and other keys. Another type of user input device 514 is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. Yet other examples of suitable input devices 514 include a touch-screen panel affixed to a display 512, cameras, microphones, accelerometers, motion detectors, and/or other sensors. In an embodiment, a network-based input device 514 may be utilized. In such an embodiment, user input and/or other information or commands may be relayed via routers and/or switches on a Local Area Network (LAN) or other suitable shared network, or via a peer-to-peer network, from the input device 514 to a network link 520 on the computer system 500.

A computer system 500 may implement techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 500 can receive the data on the network and demodulate the signal to decode the transmitted instructions. Appropriate circuitry can then place the data on bus 502. Bus 502 carries the data to main memory 505, from which processor 504 retrieves and executes the instructions. The instructions received by main memory 506 may optionally be stored on storage device 510 either before or after execution by processor 504.

A computer system 500 may also include, in an embodiment, one or more communication interfaces 518 coupled to bus 502. A communication interface 518 provides a data communication coupling, typically two-way, to a network link 520 that is connected to a local network 522. For example, a communication interface 518 may be an integrated services digital network (ISDN) card, cable modem, satellite modem, or a modem to provide a data communication connection to a corresponding type of telephone line. As another example, the one or more communication interfaces 518 may include a local area network (LAN) card to provide a data communication connection to a compatible LAN. As yet another example, the one or more communication interfaces 518 may include a wireless network interface controller, such as a 802.11-based controller, Bluetooth controller, Long Term Evolution (LTE) modem, and/or other types of wireless interfaces. In any such implementation, communication interface 518 sends and receives electrical, electromagnetic, or optical signals that carry digital data streams representing various types of information.

Network link 520 typically provides data communication through one or more networks to other data devices. For example, network link 520 may provide a connection through local network 522 to a host computer 524 or to data equipment operated by a Service Provider 526. Service Provider 526, which may for example be an Internet Service Provider (ISP), in turn provides data communication services through a wide area network, such as the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

In an embodiment, computer system 500 can send messages and receive data, including program code and/or other types of instructions, through the network(s), network link 520, and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution. As another example, information received via a network link 520 may be interpreted and/or processed by a software component of the computer system 500, such as a web browser, application, or server, which in turn issues instructions based thereon to a processor 504, possibly via an operating system and/or other intermediate layers of software components.

In an embodiment, some or all of the systems described herein may be or comprise server computer systems, including one or more computer systems 500 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for range data compression, the method comprising:
    generating a current range data frame for a current time point, the current range data frame including a two-dimensional (2D) array of current range data cells, each current range data cell in the 2D array of cells of the current range data frame including zero or more current ranges, the zero or more current ranges in the current range data cell representing zero or more points in a point cloud in a three-dimensional (3D) space for the current time point;
    propagating accumulated prior ranges in an accumulated prior range buffer from a prior time point to the current time point, the accumulated prior ranges having been accumulated from past range data up to the prior time point, the propagated accumulated prior ranges constituting a set of propagated accumulated prior ranges in a 2D array of accumulated prior range data cells;
    comparing a set of current ranges in the 2D array of current range data cells with the set of propagated accumulated prior ranges in the 2D array of propagated accumulated prior ranges to determine a set of range differences between the set of current ranges and the set of propagated accumulated prior ranges;
    identifying, based at least in part on the set of range differences, a proper subset of current ranges in the set of current ranges; and
    including the proper subset of current ranges in a range data signal to be transmitted from a range data transmitter to a range data receiver, the range data signal excluding other current ranges in the set of current ranges other than the proper subset of current ranges.

2. The method of claim 1, wherein the zero or more points, represented by the zero or more current ranges in the current range data cell, have a specific azimuth angle and a specific elevation angle as indicated by a cell index of the current range data cell.

3. The method of claim 1, wherein the zero or more current ranges in the current range data cell are generated at least in part from zero or more source ranges acquired by a range data sensor through egomotion correction; wherein the egomotion correction is specified by a multidimensional rate of change in poses of the sensor times a time difference; wherein the time difference relates to a data acquisition time point at which the zero or more source ranges are acquired by the range data sensor.

4. The method of claim 1, wherein the propagated accumulated prior ranges are generated at least in part from the accumulated prior ranges through spatial transformations; wherein the spatial transformation are specified by a multidimensional rate of change in poses of the sensor multiplied by a time difference; wherein the time difference is a difference between the prior time point and the current time point.

5. One or more non-transitory computer readable media storing a program of instructions that is executable by a device to perform a method as recited in claim 4.

6. A system, comprising: one or more computing processors; one or more non-transitory computer readable media storing a program of instructions that is executable by the one or more computing processors to perform a method as recited in claim 4.

7. The method of claim 1, wherein the set of current ranges includes at least one current range obtained from interpolating pre-resampled current ranges to a specific angle indicated by a cell index of a current range data cell in the 2D array of current range data cells; wherein the set of propagated accumulated prior ranges includes at least one propagated accumulated prior range obtained from interpolating pre-resampled propagated accumulated prior ranges to a specific angle indicated by a cell index of a current range data cell in the 2D array of current range data cells.

8. One or more non-transitory computer readable media storing a program of instructions that is executable by a device to perform a method as recited in claim 7.

9. A system, comprising: one or more computing processors; one or more non-transitory computer readable media storing a program of instructions that is executable by the one or more computing processors to perform a method as recited in claim 7.

10. The method of claim 1, wherein the proper subset of current ranges are represented in a compressed data construct; wherein the compressed data construct includes a series of indicators each of which corresponds to a respective current range in the other current ranges excluded from the range data signal; wherein the series of indicators instructs the range data receiver to generate a reconstructed version of the other current ranges from propagating receiver-maintained accumulated prior ranges up to the prior time point.

11. One or more non-transitory computer readable media storing a program of instructions that is executable by a device to perform a method as recited in claim 10.

12. A system, comprising: one or more computing processors; one or more non-transitory computer readable media storing a program of instructions that is executable by the one or more computing processors to perform a method as recited in claim 10.

13. The method of claim 1, wherein the proper subset of current ranges is identified in the set of current ranges further based on one of: a maximum range error threshold, a minimum range similarity threshold, or another range comparison threshold.

14. One or more non-transitory computer readable media storing a program of instructions that is executable by a device to perform a method as recited in claim 13.

15. A system, comprising: one or more computing processors; one or more non-transitory computer readable media storing a program of instructions that is executable by the one or more computing processors to perform a method as recited in claim 13.

16. One or more non-transitory computer readable media storing a program of instructions that is executable by a device to perform a method as recited in claim 1.

17. A system, comprising: one or more computing processors; one or more non-transitory computer readable media storing a program of instructions that is executable by the one or more computing processors to perform a method as recited in claim 1.

18. A method for range data decompression, the method comprising:
   decoding, for reconstructing a current range data frame, a proper subset of current ranges from a range data signal transmitted from a range data transmitter to a range data receiver, the current range data frame including a set of current ranges to which the proper subset of current ranges belongs, the range data signal excluding other current ranges in the set of current ranges other than the proper subset of current ranges;
   propagating accumulated prior ranges in an accumulated prior range buffer from a prior time point to the current time point, the accumulated prior ranges having been accumulated from past range data up to the prior time point, the propagated accumulated prior ranges constituting a set of propagated accumulated prior ranges in a two-dimensional (2D) array of accumulated prior range data cells;
   combining the proper subset of current ranges and the set of propagated accumulated prior ranges into a reconstructed version of the current range data frame;
   mapping a three-dimensional (3D) space with a point cloud, the point cloud being constituted with a set of points represented at least in part by a set of ranges in a 2D array of the reconstructed version of the current range data frame.

19. One or more non-transitory computer readable media storing a program of instructions that is executable by a device to perform a method as recited in claim 18.

20. A system, comprising: one or more computing processors; one or more non-transitory computer readable media storing a program of instructions that is executable by the one or more computing processors to perform a method as recited in claim 18.

* * * * *